(12) United States Patent
Mu

(10) Patent No.: US 12,224,870 B2
(45) Date of Patent: Feb. 11, 2025

(54) METHOD FOR DETERMINING TIME INTERVAL AND HARQ-ACK SENDING METHOD

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 501 days.

(21) Appl. No.: 17/627,801

(22) PCT Filed: Jul. 16, 2019

(86) PCT No.: PCT/CN2019/096194
§ 371 (c)(1),
(2) Date: Jan. 17, 2022

(87) PCT Pub. No.: WO2021/007780
PCT Pub. Date: Jan. 21, 2021

(65) Prior Publication Data
US 2022/0278779 A1    Sep. 1, 2022

(51) Int. Cl.
*H04L 1/18* (2023.01)
*H04L 1/1829* (2023.01)
(Continued)

(52) U.S. Cl.
CPC ....... *H04L 1/1854* (2013.01); *H04W 72/0446* (2013.01); *H04W 72/23* (2023.01)

(58) Field of Classification Search
CPC .. H04L 1/1854; H04W 72/23; H04W 72/0446
See application file for complete search history.

(56) References Cited

U.S. PATENT DOCUMENTS

2010/0182939 A1    7/2010    Ojala et al.
2018/0124648 A1    5/2018    Park et al.
(Continued)

FOREIGN PATENT DOCUMENTS

CN    106060947 A    10/2016
CN    108401301 A    8/2018
(Continued)

OTHER PUBLICATIONS

Qualcomm, R1-1911124, 'Remaining Design Details for URLLC Downlink SPS', Oct. 14-20, 2019, 3GPP TSG-RAN WG1 #98b, pp. 1-4. (Year: 2019).*
(Continued)

*Primary Examiner* — Melvin C Marcelo
(74) *Attorney, Agent, or Firm* — Arch & Lake LLP

(57) ABSTRACT

A method for determining time interval, a time interval indication method, and an HARQ-ACK sending method. The method for determining time interval includes: receiving, by a terminal, a plurality of SPS configurations, different SPS configurations having different periods; and determining, by a terminal, a time interval between receiving time of a PDSCH of each of the SPS configurations and sending time of an HARQ-ACK for the PDSCH according to a corresponding period in each of the SPS configurations, the corresponding period is positively correlated with the time interval.

19 Claims, 17 Drawing Sheets

(51) Int. Cl.
  *H04W 72/04* (2023.01)
  *H04W 72/0446* (2023.01)
  *H04W 72/23* (2023.01)

(56) References Cited

U.S. PATENT DOCUMENTS

2019/0116608 A1 4/2019 Kim et al.
2023/0300816 A1* 9/2023 Guo .................. H04W 72/11
                                            370/329

FOREIGN PATENT DOCUMENTS

| CN | 108811114 | A |   | 11/2018 |   |          |
|----|-----------|---|---|---------|---|----------|
| CN | 109076590 | A |   | 12/2018 |   |          |
| CN | 109802763 | A |   | 5/2019  |   |          |
| EP | 4412135   | A1| * | 8/2024  |   | H04L 1/00|
| WO | 2017164698| A1|   | 9/2017  |   |          |
| WO | 2018080212| A2|   | 5/2018  |   |          |

OTHER PUBLICATIONS

Nokia, R1-1906758, 'Support for SPS periodicities below a slot', May 13-17, 2019, 3GPP TSG RAN WG1 Meeting #97, pp. 1-8. (Year: 2019).*
International Search Report of PCT Application No. PCT/CN2019/096194 dated Apr. 15, 2020 with English translation, (4p).
ZTE, "Enhancements for DL SPS Configurations", 3GPP TSG RAN WG1 #97, R1-1906416, Reno NV, May 17, 2019, (5p).
First CNOA issued in Application No. 201980001394.3, with English translation,(17p).
NTT DOCOMO, Inc. "Physical layer enhancements for DL SPS", 3GPP TSG RAN WG1 #97, R1-1906219, May 13-17, 2019, Reno, USA,(7p).
First Search Report issued in Chinese Application No. 20198000139.4 with English translation,(2p).

* cited by examiner

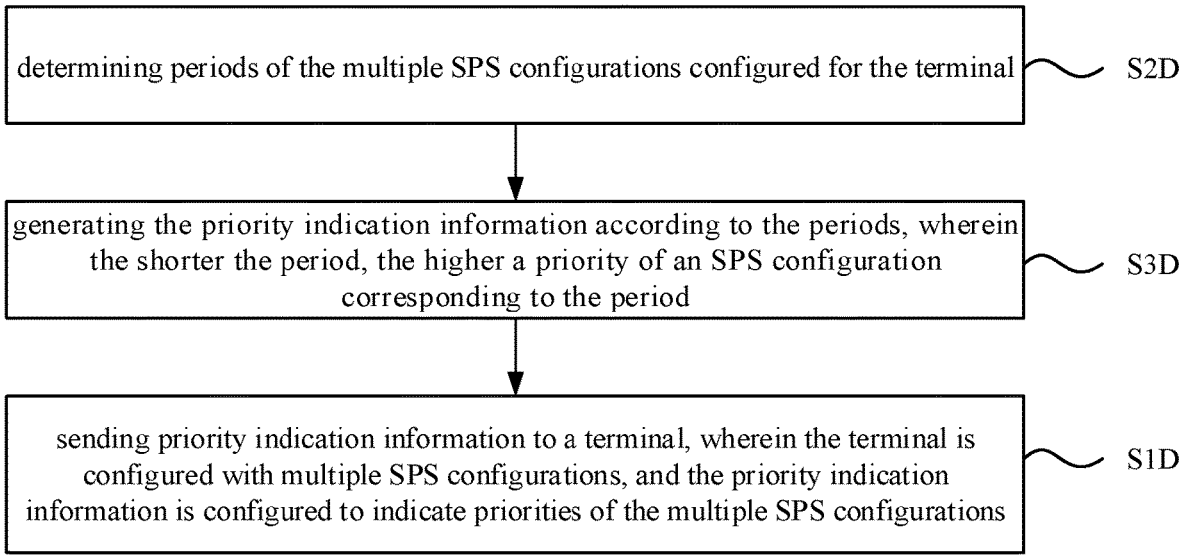
Fig. 17
Fig. 18
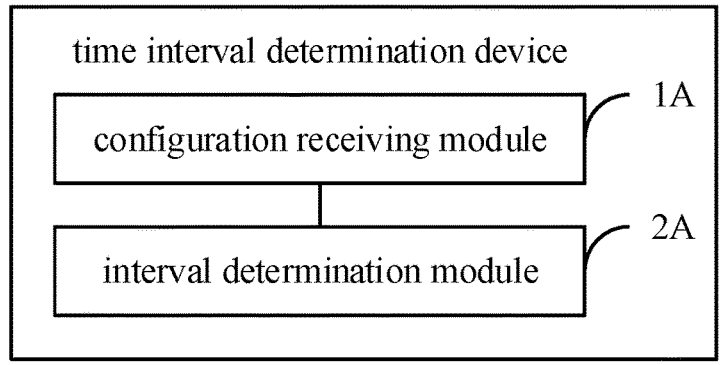
Fig. 19
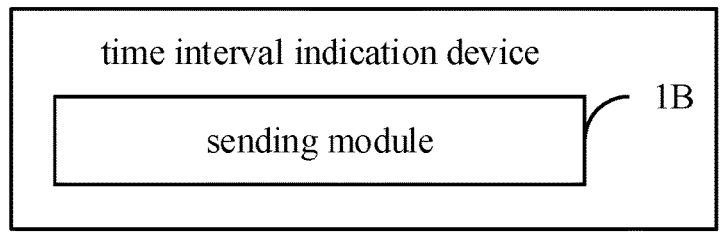
Fig. 20

METHOD FOR DETERMINING TIME INTERVAL AND HARQ-ACK SENDING METHOD

CROSS REFERENCE TO RELATED APPLICATION

The present application is a U.S. National Phase of International Patent Application Serial No. PCT/CN2019/096194 filed on Jul. 16, 2019. The entire contents of the above-cited application are hereby incorporated by reference for all purposes.

BACKGROUND

The downlink transmission mode of Semi-Persistent Scheduling (SPS) is designed in related arts. A base station may configure parameters such as the period for SPS, and one piece of User Equipment (UE) has only one SPS configuration.

The base station may indicate a time domain resource of a beginning of a Physical Downlink Shared Channel (PDSCH) of SPS by activating Downlink Control Information (DCI). Upon receiving a PUSCH, the UE may send Hybrid Automatic Repeat request-Acknowledgement (HARQ-ACK) to the base station on a Physical Uplink Control Channel (PUCCH).

SUMMARY

In view of this, the examples of the disclosure propose a method for determining time interval, a time interval indication method, an HARQ-ACK sending method, a priority indication method, a time interval determination device, a time interval indication device, an HARQ-ACK sending device, a priority indication device, electronic equipment and a computer-readable storage medium to solve some problems caused by configuring multiple SPS configurations for UE in related arts.

According to a first aspect of the example of the disclosure, a method for determining time interval is proposed, and the method includes:

receiving, by a terminal, a plurality of SPS configurations, different SPS configurations having different periods; and determining, by the terminal, a time interval between receiving time of a PDSCH of each of the SPS configurations and sending time of a HARQ-ACK for the PDSCH according to a corresponding period in each of the SPS configurations, the corresponding period is positively correlated with the time interval.

According to a second aspect of the example of the disclosure, a time interval indication method is proposed, which is applicable to a base station, and the method includes:

sending, by a base station, a plurality of SPS configurations and indication information to a terminal, different SPS configurations having different periods, the indication information being configured to indicate the terminal to determine a time interval between receiving time of a PDSCH and sending time of an HARQ-ACK for the PDSCH according to the period of each of the SPS configurations, and the period being positively correlated with the time interval.

According to a third aspect of the example of the disclosure, an HARQ-ACK sending method is proposed, which is applicable to a terminal, and the terminal is configured with multiple SPS configurations. The method includes:

determining that PUCCH resources of HARQ-ACKs for different PDSCHs configured based on multiple SPS configurations overlap one another in a time domain, the PUCCH resources being configured to send the HARQ-ACKs;

determining a target HARQ-ACK for a PDSCH based on a selected SPS configuration in the multiple SPS configurations; and sending the target HARQ-ACK on a target PUCCH resource corresponding to the target HARQ-ACK.

BRIEF DESCRIPTION OF THE DRAWINGS

In order to explain the technical solution in the examples of the disclosure more clearly, the drawings used in the description of the examples will be briefly introduced below. Obviously, the drawings in the following description are only some examples of the disclosure, and for those of ordinary skill in the art, other drawings can be obtained according to these drawings without paying creative labor.

FIG. 17 is a flow diagram of a priority indication method according to an example of the disclosure.

FIG. 18 is a flow diagram of another priority indication method according to an example of the disclosure.

FIG. 19 is a block diagram of a time interval determination device according to an example of the disclosure.

FIG. 20 is a block diagram of a time interval indication device according to an example of the disclosure.

DETAILED DESCRIPTION

The technical solution in the examples of the disclosure will be clearly and completely described below with reference to the drawings in the examples of the disclosure. Obviously, the described examples are only part of the examples of the disclosure, not all of the examples. Based on the examples in the disclosure, all other examples obtained by those of ordinary skill in the art without creative labor are within the scope of protection of the disclosure.

As the current SPS period is at least 10 ms, the period of receiving the PDSCH is too long for some services that need to frequently receive downlink shared channels. Moreover, in each slot, the HARQ-ACK can be sent only one time in a PUCCH resource, which means that the period of feeding back the HARQ-ACK to the base station is too long for some services requiring low feedback delays.

In order to solve the above problems, configuring multiple SPS configurations for one piece of UE is considered in relates arts, and the periods of different SPS configurations may be different to adapt to different services. However, this scheme also has problems.

Figure 1:
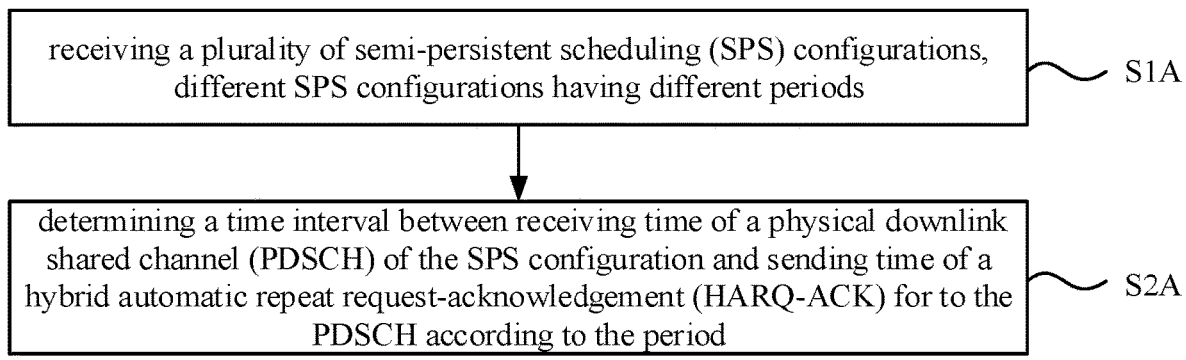
FIG. 1 is a flow diagram of a method for determining time interval according to an example of the disclosure.

FIG. 1 is a flow diagram of a method for determining time interval according to an example of the disclosure. The method for determining time interval described in this example can be applied to a terminal, which includes but is not limited to a mobile phone, a tablet computer, a wearable device and other electronic devices. The terminal can be used as user equipment (UE) to communicate with a base station based on 4G LTE (Long Term Evolution) or 5G NR (New Radio).

As shown in FIG. 1, the method for determining time interval may include the following steps:

S1A, receiving, by a terminal, a plurality of SPS configurations, different SPS configurations having different periods; and S2A, determining, by a terminal, a time interval between receiving time of a PDSCH of each of the SPS configurations and sending time of a HARQ-ACK for to the PDSCH according to a corresponding period in each of the SPS configurations, the corresponding period is positively correlated with the time interval.

It should be noted that the period being positively correlated with the time interval means that the larger the period, the larger the time interval, and the shorter the period, the shorter the time interval.

In one example, based on the periods of the SPS configurations, the terminal as UE may periodically receive the PDSCHs, and for a reception result of each PDSCH, the terminal may send HARQ-ACKs to the base station, so that the base station determines whether the UE has successfully received the PDSCHs.

In addition to the period, the SPS configuration may also include the parameter n1PUCCH-AN, which may indicate an identifier of a PUCCH resource used by an HARQ-ACK sent by the UE for the PDSCH of each of the SPS configurations, for example, the identifier may be an index, based on which one PUCCH resource may be determined from a PUCCH resource set (the PUCCH resource set is configured by the base station to the terminal at an RRC layer) to carry the HARQ-ACK information.

The time interval between the receiving time of the PDSCH by the UE and the sending time of the HARQ-ACK (that is, a time domain starting position of a PUCCH resource for sending the HARQ-ACK) may be determined according to a preset coefficient k1.

In the prior art, the UE is only configured with one SPS configuration, the above time interval is determined only based on k1, and the time interval is specifically equal to k1 slots, so that which identified resource is used to send the HARQ-ACK every other k1 slots may be determined according to the parameter n1PUCCH-AN and the k1 slots.

However, when the UE is configured with multiple SPS configurations, if the time interval is determined only based on k1, the time intervals between the receiving time of the PDSCHs and the sending time of the HARQ-ACKs are the same for different SPS configurations, which makes it difficult to configure the PUCCH resources of the HARQ-ACKs according to the requirements of different services for delays, that is, configuration flexibility is low.

According to the example of the disclosure, the time interval between receiving time of the PDSCH of each of the SPS configurations and sending time of the HARQ-ACK for the PDSCH may be determined according to the corresponding period.

SPS configurations with shorter periods are generally aimed at services with lower allowable delays, SPS configurations with longer periods are generally aimed at services with larger allowable delays, and the period is positively correlated with the time interval, that is, for SPS configurations with shorter periods, the determined time intervals are short, so that after receiving the PDSCH, the HARQ-ACK may be sent to the base station as soon as possible, so as to meet the requirement of services with lower allowable delays for the delay of HARQ-ACK feedback.

Figure 1A:
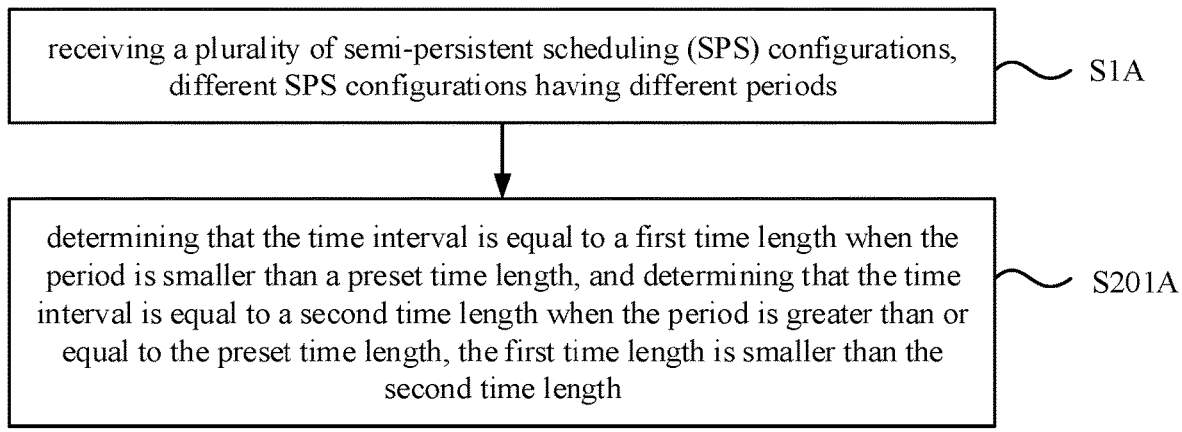
FIG. 1A is a flow diagram of another method for determining time interval according to an example of the disclosure.

FIG. 1A is a flow diagram of another method for determining time interval according to an example of the disclosure. As shown in FIG. 1A, determining the time interval between receiving time of the PDSCH of each of the SPS configurations and the sending time of the HARQ-ACK for the PDSCH according to the corresponding period includes:

S201A, determining that the time interval is equal to a first time length when the period is shorter than a preset time length, and determining that the time interval is equal to a second time length when the period is greater than or equal to the preset time length, and the first time length is shorter than the second time length.

Specifically, when the period of the SPS configuration is short, for example, the period is shorter than the preset time length, the determined time interval is short, which is the first time length; when the period of the SPS configuration is large, for example, the period is greater than or equal to the preset time length, the determined time interval is large, which is the second time length. The preset time length may be configured by the base station to the terminal, or may be pre-agreed by a communication protocol between the terminal and the base station. Based on the preset period, whether the period of the SPS configuration is relatively large or short may be determined.

In one example, when the period of the SPS configuration is short, for example, the period is shorter than the preset time length, the determined time interval is short, which is the first time length; when the period of the SPS configuration is large, for example, the period is greater than or equal to the preset time length, the determined time interval is large, which is the second time length. The first time length and the second time length may be configured by the base station to the terminal or pre-stored by the terminal.

This example may be implemented for two SPS configurations or multiple SPS configurations. For example, for two SPS configurations, the periods of the two SPS configurations are different, and the time intervals determined by the terminal are different. For example, for multiple SPS configurations, the periods of the multiple SPS configurations may be all compared with the preset time length, so that the terminal may determine two time intervals at most, and the two time intervals may meet the needs of two services with different allowable HARQ-ACK feedback delays in most cases.

In addition, as an extended example, when there are more than two SPS configurations, there may be multiple preset time lengths. For example, when there are three SPS configurations, there may be two preset time lengths, so that the relationship between the periods of the three SPS configurations from short to large may be determined based on the two preset time lengths, and further, for the three periods from short to large, three time intervals from short to large may be determined, so as to determine different time intervals for feeding back HARQ-ACKs for different services corresponding to the three SPS configurations to meet the requirements of each service for delays.

It should be noted that the preset time length may be configured by the base station to the terminal, or may be pre-agreed by a communication protocol between the terminal and the base station. Based on the preset period, whether the period of the SPS configuration is relatively large or short may be determined.

Optionally, determining that the time interval is equal to the first time length includes:

calculating the first time length according to a preset coefficient and a first unit time length;

determining that the time interval is equal to the second time length includes:

calculating the second time length according to the preset coefficient and a second unit time length;

the first unit time length is shorter than the second unit time length.

In one example, the terminal may calculate the first time length according to the preset coefficient and the first unit time length, for example, if the preset coefficient is k1 and the first unit time length is a sub-slot, then the first time length is equal to k1 sub-slots. The terminal may also calculate the second time length according to the preset coefficient and the second unit time length, for example, if the preset coefficient is k1 and the second unit time length is a slot, then the second time length is equal to k1 slots.

The preset coefficient k1 may be configured by the base station to the terminal, or may be pre-agreed by a communication protocol between the terminal and the base station. Based on the preset coefficient k1, a specific time length of the time interval may be calculated. The first unit time length and the second unit time length may be configured by the base station to the terminal or pre-stored by the terminal.

It should be noted that in addition to multiplying k1 with the sub-slot to obtain the first time length and multiplying k1 with the slot to obtain the second time length as shown in this example, the first time length and the second time length may also be calculated in other ways, for example, selecting a shorter time length as the first time length and a longer time length as the second time length in a preset time length list.

Optionally, the first unit time length is a sub-slot, and the second unit time length is a slot.

In one example, one slot may include a plurality of sub-slots, and the HARQ-ACK may be sent once in each sub-slot when the time interval is calculated according to the preset coefficient and the first unit time length, and the HARQ-ACK may be sent once in each slot when the time interval is calculated according to the preset coefficient and the second unit time length.

In addition, the parameter n1PUCCH-AN may indicate an identifier of the PUCCH used by the HARQ-ACK sent by the UE for the PDSCH of the SPS configuration, and the indicated identifiers are the same for sub-slots and slots.

For example, if the PUCCH resource of the sent HARQ-ACK is a PUCCH resource with an index 2, the index of the PUCCH resource corresponding to a format of the PUCCH resource (for example, format 1, format 2, etc.), a time-frequency position of the PUCCH resource, etc., then in sub-slots and slots, the PUCCH resource is determined according to the format and time-frequency position corresponding to the index 2 to send the HARQ-ACK.

It should be noted that the first unit time length may be other time lengths besides the sub-slot, for example, several symbols, and the second unit time length may be other time lengths besides the slot, for example, several symbols, as long as it is ensured that the number of symbols contained in the first unit time length is shorter than the number of symbols contained in the second unit time length.

According to the example of the disclosure, the time interval between receiving time of the PDSCH of each of the SPS configurations and the sending time of the HARQ-ACK for the PDSCH can be determined according to the corresponding period. SPS configurations with shorter periods are generally aimed at services with lower allowable delays, SPS configurations with longer periods are generally aimed at services with larger allowable delays, and the period is positively correlated with the time interval, that is, for SPS configurations with shorter periods, the determined time intervals are short, so that after receiving the PDSCH, the HARQ-ACK may be sent to the base station as soon as possible, so as to meet the requirement of services with lower allowable delays for the delay of HARQ-ACK feedback.

Figure 2:
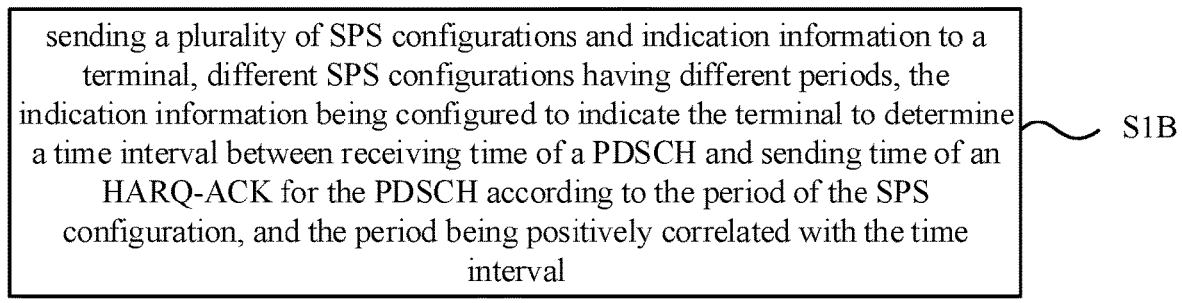
FIG. 2 is a flow diagram of a time interval indication method according to an example of the disclosure.

FIG. 2 is a flow diagram of a time interval indication method according to an example of the disclosure. The time interval indication method described in this example may be applied to a base station, which may communicate with a terminal, and the terminal includes but is not limited to a mobile phone, a tablet computer, a wearable device and other electronic devices. The base station and the terminal may communicate based on 4G LTE or 5G NR.

As shown in FIG. 2, the time interval indication method may include the following steps:

S1B, sending, by a base station, a plurality of SPS configurations and indication information to a terminal, different SPS configurations having different periods, the indication information being configured to indicate the terminal to determine a time interval between receiving time of a PDSCH and sending time of an HARQ-ACK for the PDSCH according to the period of each of the SPS configurations, and the period being positively correlated with the time interval.

In one example, based on the periods of each of the SPS configurations, UE may periodically receive the PDSCHs, and for a reception result of each PDSCH, the terminal may send HARQ-ACKs to the base station, so that the base station determines whether the UE has successfully received the PDSCHs.

In addition to the period, the SPS configuration may also include the parameter n1PUCCH-AN, which may indicate an identifier of a PUCCH resource used by an HARQ-ACK sent by the UE for the PDSCH of each of the SPS configurations, the identifier may be an index, based on which one PUCCH resource may be determined from a PUCCH resource set (the PUCCH resource set is configured by the base station to the terminal at an RRC layer) to carry the HARQ-ACK information.

The time interval between the receiving time of the PDSCH by the UE and the sending time of the HARQ-ACK (that is, a time domain starting position of a PUCCH resource for sending the HARQ-AKC) may be determined according to a preset coefficient k1.

In the prior art, the UE is only configured with one SPS configuration, the above time interval is determined only based on k1, and the time interval is specifically equal to k1 slots, so that which identified resources are used to send the HARQ-ACK every other k1 slots may be determined according to the parameter n1PUCCH-AN and the k1 slots.

However, when the UE is configured with multiple SPS configurations, if the time interval is determined only based on k1, the time intervals between the receiving time of the PDSCHs and the sending time of the HARQ-ACKs are the same for different SPS configurations, which may cause low configuration flexibility of the PUCCH resource of the HARQ-ACK and cause the PUCCH resources of HARQ-ACKs for PDSCHs of different SPS configurations to overlap one another in a time domain.

In one example, the base station sends multiple SPS configurations and indication information to the terminal, and there may be one or more pieces of indication information. For example, in response to there are multiple pieces of indication information, then the number of pieces of the indication information may be equal to the number of the SPS configurations, and each piece of indication information corresponds to one SPS configuration.

The indication information may indicate the terminal to determine different time intervals for SPS configurations with different periods, so that the periods are positively correlated with the time intervals.

SPS configurations with shorter periods are generally aimed at services with lower allowable delays, SPS configurations with longer periods are generally aimed at services with larger allowable delays, and the period is positively correlated with the time interval, that is, for SPS configurations with shorter periods, the determined time intervals are short, so that after receiving the PDSCH, the terminal may send the HARQ-ACK to the base station as soon as possible, so as to meet the requirements of services with lower allowable delays for the delay of HARQ-ACK feedback.

Optionally, the indication information is configured to indicate the terminal to determine that a first time interval between receiving time of a first PDSCH and sending time of an HARQ-ACK for the first PDSCH is a first time length, and/or a second time interval between receiving time of a second PDSCH and sending time of an HARQ-ACK for the second PDSCH is a second time length, the first PDSCH is based on a first SPS configuration, and the second PDSCH is based on a second SPS configuration; and a period of the first SPS configuration is shorter than a preset time length, a period of the second SPS configuration is greater than or equal to the preset time length, and the first time length is shorter than the second time length.

In one example, when the period of the SPS configuration is short, for example, the period is shorter than the preset time length, the determined time interval is short, which is the first time length; when the period of the SPS configuration is large, for example, the period is greater than or equal to the preset time length, the determined time interval is large, which is the second time length.

Optionally, the indication information is configured to indicate the terminal to calculate the first time length according to a preset coefficient and a first unit time length, and/or to calculate the second time length according to the preset coefficient and a second unit time length, and the first unit time length is shorter than the second unit time length.

In one example, the base station may indicate the terminal through the indication information to calculate the first time length according to the preset coefficient and the first unit time length, for example, if the preset coefficient is k1 and the first unit time length is a sub-slot, then the calculated first time length is equal to k1 sub-slots. The terminal may also calculate the second time length according to the preset coefficient and the second unit time length, for example, if the preset coefficient is k1 and the second unit time length is a slot, then the calculated second time length is equal to k1 slots.

The preset coefficient k1 may be configured by the base station to the terminal, or may be pre-agreed by a communication protocol between the terminal and the base station. Based on the preset coefficient k1, a specific time length of the time interval may be calculated.

It should be noted that in addition to multiplying k1 with the sub-slot to obtain the first time length and multiplying k1 with the slot to obtain the second time length as shown in this example, the first time length and the second time length may also be calculated in other ways, for example, selecting a shorter time length as the first time length and a longer time length as the second time length in a preset time length list.

Optionally, the first unit time length is a sub-slot, and the second unit time length is a slot.

In one example, one slot may include a plurality of sub-slots, and the HARQ-ACK may be sent once in each sub-slot when the time interval is calculated according to the preset coefficient and the first unit time length, and the HARQ-ACK may be sent once in each slot when the time interval is calculated according to the preset coefficient and the second unit time length.

In addition, the parameter n1PUCCH-AN may indicate an identifier of the PUCCH source used by the HARQ-ACK sent by the UE for the PDSCH of the SPS configuration, and the indicated identifiers are the same for sub-slots and slots.

For example, if the PUCCH resource of the sent HARQ-ACK is a PUCCH resource with an index 2, the index of the PUCCH resource corresponding to a format of the PUCCH resource (for example, format 1, format 2, etc.), a time-frequency position of the PUCCH resource, etc., then in sub-slots and slots, determination is based on the format and time-frequency position corresponding to the index 2.

It should be noted that the first unit time length may be other time lengths besides the sub-slot, for example, several symbols, and the second unit time length may be other time lengths besides the slot, for example, several symbols, as long as it is ensured that the number of symbols contained in the first unit time length is shorter than the number of symbols contained in the second unit time length.

Optionally, the indication information is also configured to indicate the first SPS configuration and/or the second SPS configuration.

In one example, the indication information may be configured to indicate the first SPS configuration or the second SPS configuration.

For example, if the indication information is used to indicate the first SPS configuration, but not the second SPS configuration, then the indication information may contain the first unit time length, but not the second unit time length, and the indication information is used to indicate the terminal to calculate a time interval between receiving time of a first PDCH and sending time of an HARQ-ACK for the first PDCH according to a preset coefficient and the first unit time length.

For example, if the indication information is used to indicate the second SPS configuration, but not the first SPS configuration, then the indication information may contain the second unit time length, but not the first unit time length, and the indication information is used to indicate the terminal to calculate a time interval between receiving time of a second PDCH and sending time of an HARQ-ACK for the second PDCH according to the preset coefficient and the second unit time length.

For example, if the indication information is used to indicate the first SPS configuration and the second SPS configuration, then the indication information may include the first unit time length and the second unit time length, and the indication information is used to indicate the terminal to calculate the time interval between the receiving time of the first PDCH and the sending time of the HARQ-ACK for the first PDCH according to the preset coefficient and the first unit time length, and calculate the time interval between the receiving time of the second PDCH and the sending time of the HARQ-ACK for the second PDCH according to the preset coefficient and the second unit time length.

In order to make it clear to the terminal that the first unit time length is for the first SPS configuration and the second unit time length is for the second SPS configuration when the indication information includes the first unit time length and the second unit time length, the first SPS configuration and the first unit time length may be set in a first information field of the indication information, and the second SPS configuration and the second unit time length are set in a second information field of the indication information. In this way, after obtaining the first SPS configuration and unit time length from the first information field, the terminal may determine that the unit time length is the first unit time length for the first SPS configuration, and after obtaining the second SPS configuration and unit time length from the second information field, the terminal may determine that the unit time length is the first unit time length for the second SPS configuration.

It should be noted that the indication information in the above examples may be carried in RRC (Radio Resource Control) messages, or other messages as needed.

According to the example of the disclosure, the base station can indicate the terminal to determine different time intervals for SPS configurations with different periods by sending indication information to the terminal, and the indication information includes the first time length and/or the second time length. SPS configurations with shorter periods are generally aimed at services with lower allowable delays, and SPS configurations with longer periods are generally aimed at services with larger allowable delays. The first time length is shorter than the second time length, that is, for SPS configurations with shorter periods, the determined time intervals are short, so that after receiving the PDSCH, the HARQ-ACK may be sent to the base station as soon as possible, so as to meet the requirement of services with lower allowable delays for the delay of HARQ-ACK feedback.

Figure 3:
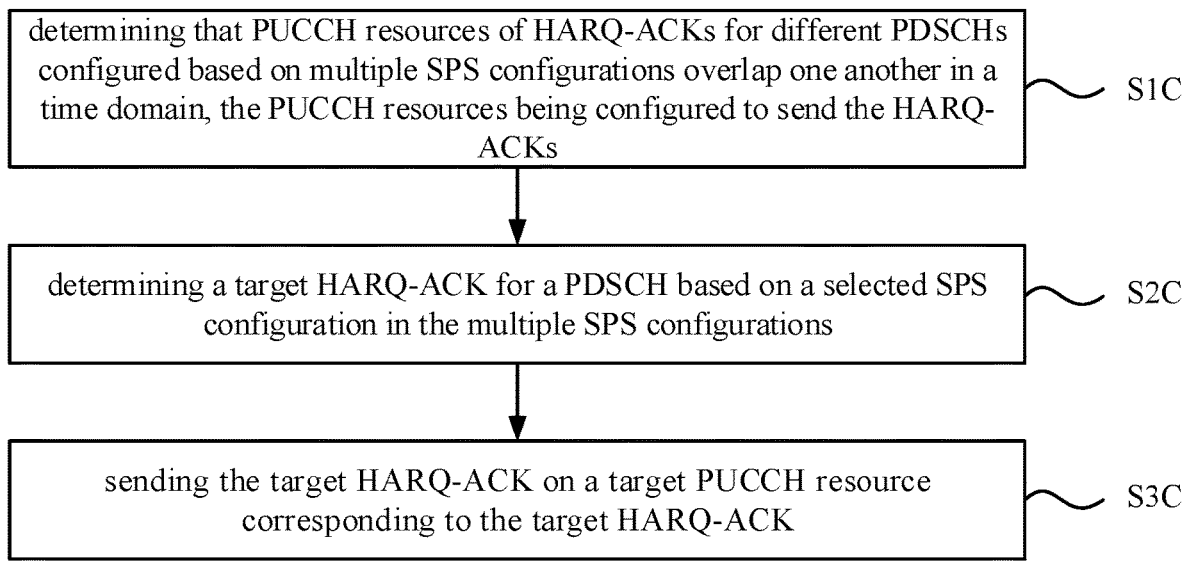
FIG. 3 is a flow diagram of an HARQ-ACK sending method according to an example of the disclosure.

FIG. 3 is a flow diagram of an HARQ-ACK sending method according to an example of the disclosure. The HARQ-ACK sending method described in this example may be applied to a terminal, which includes but is not limited to a mobile phone, a tablet computer, a wearable device and other electronic devices. The terminal may be used as user equipment (UE) to communicate with the base station based on 4G LTE or 5G NR.

As shown in FIG. 3, the HARQ-ACK sending method may include the following steps:

S1C, determining that PUCCH resources of HARQ-ACKs for different PDSCHs configured based on multiple SPS configurations overlap one another in a time domain, the PUCCH resources being configured to send the HARQ-ACKs;

S2C, determining a target HARQ-ACK for a PDSCH based on a selected SPS configuration in the multiple SPS configurations; and S3C, sending the target HARQ-ACK on a target PUCCH resource corresponding to the target HARQ-ACK.

In one example, when the base station configures multiple SPS configurations for the terminal, the base station may periodically send PDSCHs to the terminal based on the periods of the SPS configurations, and correspondingly, the terminal may periodically receive SPS sent by the base station based on the periods of the SPS configurations.

The terminal may receive different PDSCHs based on each SPS configuration, and may send HARQ-ACKs to the base station based on reception results of each PDSCH. Because sending HARQ needs to occupy PUCCH resources, PDCCHs of HARQ-ACKs for PDSCHs based on different SPS configurations may overlap one another in a time domain.

Figure 4:
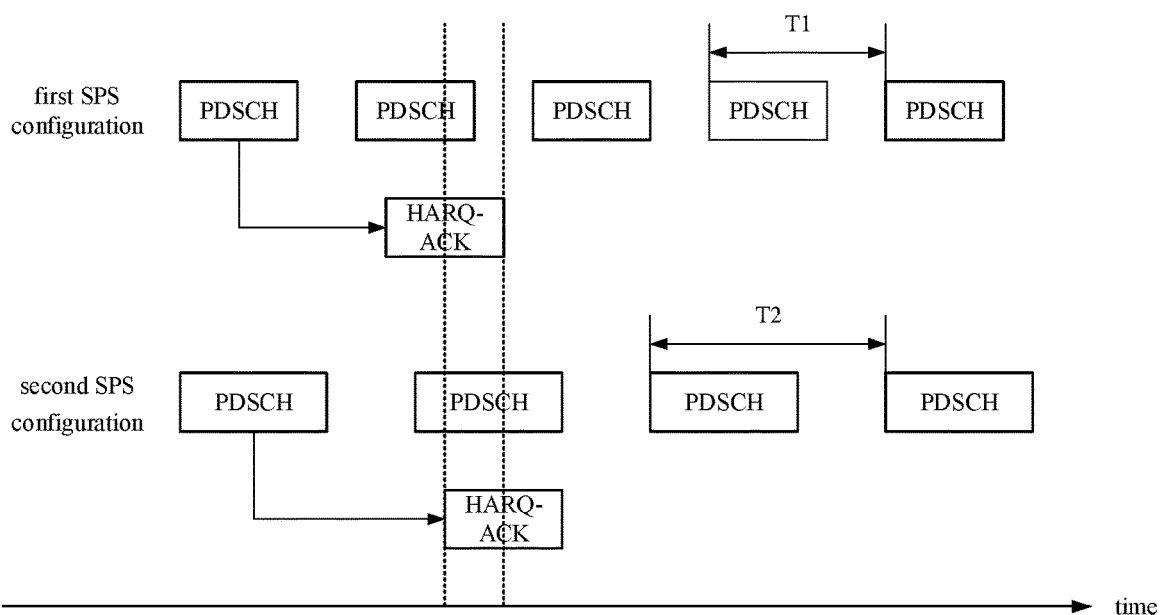
FIG. 4 is a diagram showing that PDCCHs overlap one another in a time domain according to an example of the disclosure.

FIG. 4 is a diagram showing that PDCCHs overlap one another in a time domain according to an example of the disclosure.

In one example, as shown in FIG. 4, for example, the period of the first SPS configuration is T1, the period of the second SPS configuration is T2, the PUCCH resource occupied by the HARQ-ACK for the first PDCH periodically received by the terminal based on the first SPS configuration and the PUCCH resource occupied by the HARQ-ACK for the first PDCH periodically received by the terminal based on the second SPS configuration overlap each other in the time domain shown by the dashed line.

In this case, since the PUCCH resources occupied by different HARQ-ACKs overlap one another in the time domain, two HARQ-ACKs cannot be sent at the same time on overlapping time domain resources.

Based on this example, the selected SPS configuration may be determined in the multiple SPS configurations, then the target HARQ-ACK for the PDSCH based on the selected SPS configuration (that is, the PDSCH received by the terminal based on the period of the selected SPS configuration) may be determined, and the target HARQ-ACK may be sent on the PUCCH resource corresponding to the target HARQ-ACK, ensuring that the terminal may select one HARQ-ACK to send out.

The specific selection method for the selected SPS configuration may be set as required, for example, the terminal may be set to select an SPS configuration with a shortest period as the selected SPS configuration, or select an SPS configuration with a highest priority as the selected SPS configuration according to the priorities of the SPS configurations. The following is an example description of the technical solution of the disclosure in the case that the selected SPS configuration is determined according to the priorities of the SPS configurations.

Optionally, determining the target HARQ-ACK for the PDSCH based on the selected SPS configuration in the multiple SPS configurations includes:

determining a SPS configuration with a highest priority as the selected SPS configuration according to the priorities of the multiple SPS configurations; and determining the target HARQ-ACK for the PDSCH based on the selected SPS configuration.

In one example, the base station may indicate the priorities of the multiple SPS configurations to the terminal, and then the terminal may determine the SPS configuration with the highest priority as the selected SPS configuration according to the priorities of the multiple SPS configurations, so that a target HARQ-ACK for a PDSCH of the selected SPS configuration with the highest priority may be sent on the overlapping PUCCH resources.

In one example, the base station may indicate the priorities of the multiple SPS configurations through DCI, or may indicate the priorities of the multiple SPS configurations through RRC messages.

The base station may configure different SPS configurations for the terminal for services with different allowable delays, and the indicated priority is higher for SPS configurations for services with lower allowable delays, and lower for SPS configurations for services with higher allowable delays.

In this case, the terminal may select the highest priority as a target priority, so as to ensure that when PUCCH resources of different HARQ-Acks overlap one another in the time domain, an HARQ-ACK for a service with a lowest allowable delay is sent through the PUCCH resources in the overlapping time domains, to ensure the delay from receiving the PDSCH to sending the HARQ-ACK, and meet the requirements of services for delays as much as possible.

In addition, the priorities of the SPS configurations may be indicated by the base station, and the described content of the priority indicated by the base station may be a codebook type of the HARQ-ACK for the PDSCH of the SPS configuration.

Figure 5:
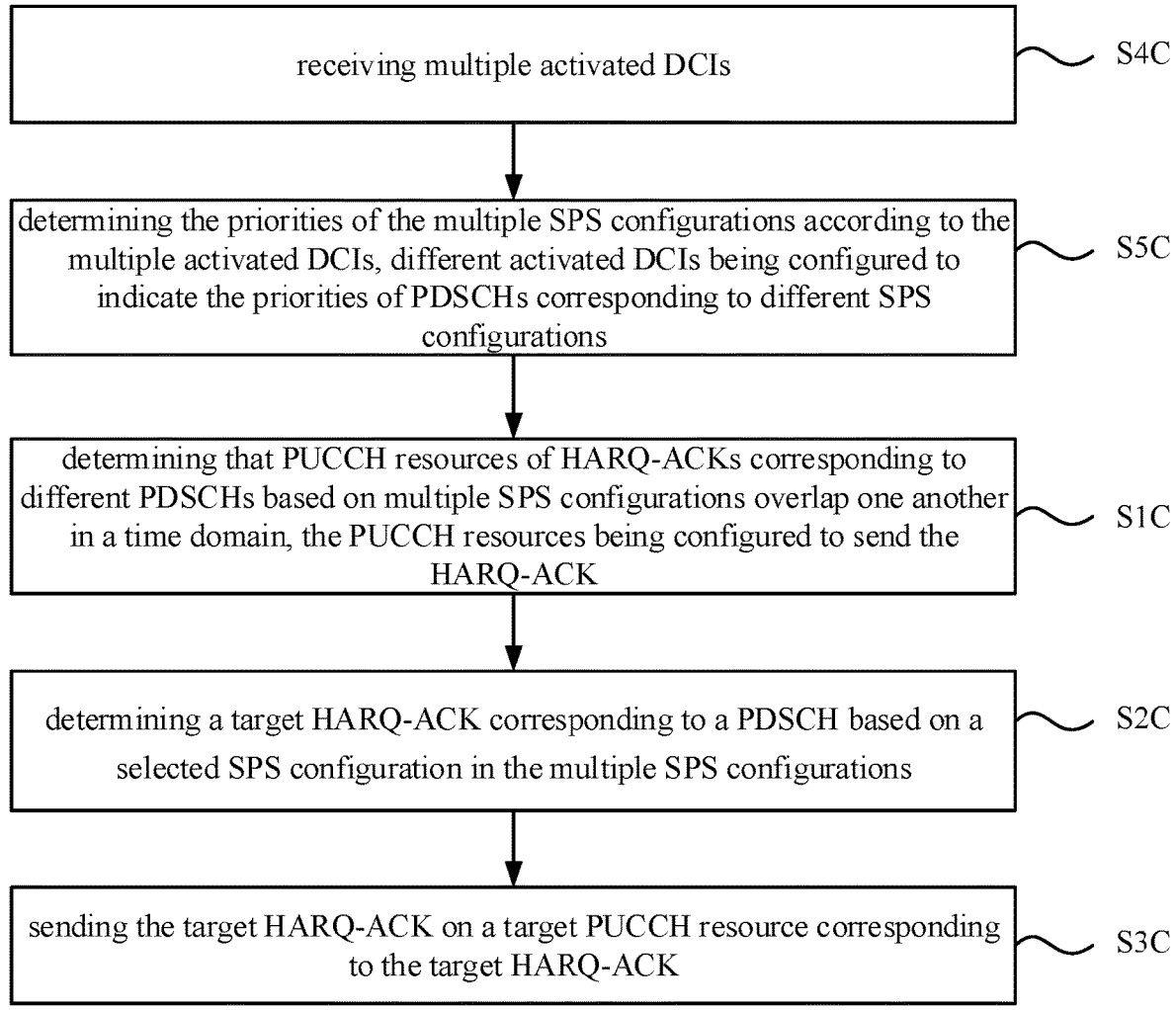
FIG. 5 is a flow diagram of another HARQ-ACK sending method according to an example of the disclosure.

FIG. 5 is a flow diagram of another HARQ-ACK sending method according to an example of the disclosure. As shown in FIG. 5, before determining that PUCCH resources of HARQ-ACKs for different PDSCHs configured based on multiple SPS configurations overlap one another in a time domain, the method further includes:

S4C, receiving multiple activated DCIs; and

S5C, determining the priorities of the multiple SPS configurations according to the multiple activated DCIs, different activated DCIs being configured to indicate the priorities of PDSCHs corresponding to different SPS configurations.

In one example, the base station may indicate the priorities of multiple SPS configurations through the multiple activated DCIs, and may indicate the priorities of different SPS configurations through different activated DCIs. The terminal may determine the priorities of multiple SPS configurations according to the received activated DCIs.

In related arts, the function of activating DCIs is to indicate a starting time of a PDSCH corresponding to the SPS configuration, but in this example, on this basis, the activated DCI may carry the priority information of the SPS configuration, so that the terminal may determine the starting time of the PDSCH corresponding to the SPS configuration and the priority information of the SPS configuration by receiving the activated DCI.

Figure 6:
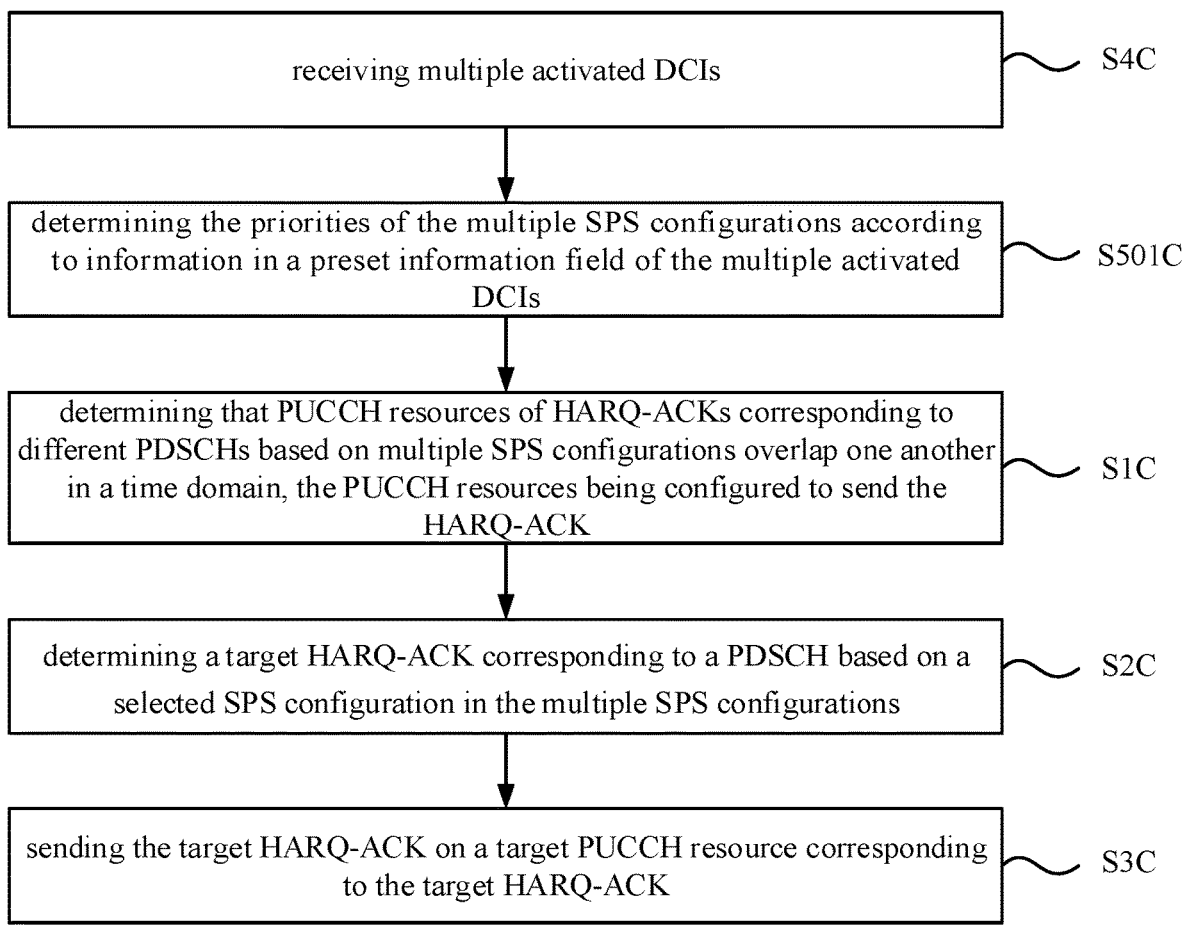
FIG. 6 is a flow diagram of another HARQ-ACK sending method according to an example of the disclosure.

FIG. 6 is a flow diagram of another HARQ-ACK sending method according to an example of the disclosure. As shown in FIG. 6, determining the priorities of the multiple SPS configurations according to the multiple activated DCIs includes:

S501C, determining the priorities of the multiple SPS configurations according to information in a preset information field of the multiple activated DCIs.

In one example, the base station may directly write the priority information of the SPS configuration in a preset information field of the activated DCI, and explicitly indicate the priority of the SPS configuration, so that the terminal may directly determine the priority of the SPS configuration according to the content of the activated DCI.

Figure 7:
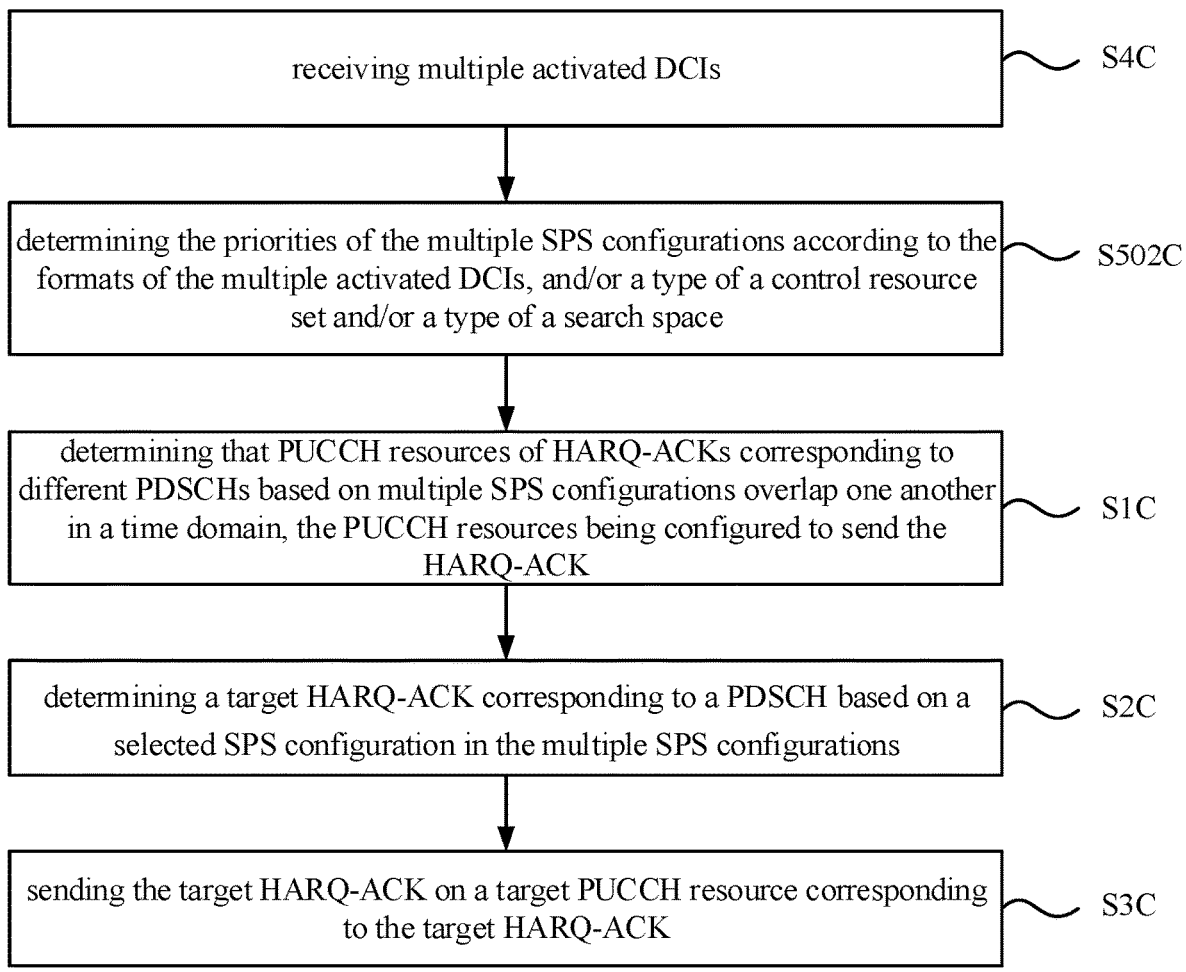
FIG. 7 is a flow diagram of another HARQ-ACK sending method according to an example of the disclosure.

FIG. 7 is a flow diagram of another HARQ-ACK sending method according to an example of the disclosure. As shown in FIG. 7, determining the priorities of the multiple SPS configurations according to the multiple activated DCIs includes:

S502C, determining the priorities of the multiple SPS configurations according to the formats of the multiple activated DCIs, and/or a type of a control resource set and/or a type of a search space.

In one example, the base station may indicate the priority of the SPS configuration through a format of the activated DCI, or a type of a control resource set of the activated DCI, or a type of a search space of the activated DCI, so as to implicitly indicate the priority of the SPS configuration. The terminal may determine the priority of the SPS configuration according to the format of the activated DCI, and/or the type of the control resource set, and/or the type of the search space without obtaining the specific content of the activated DCI.

Figure 8:
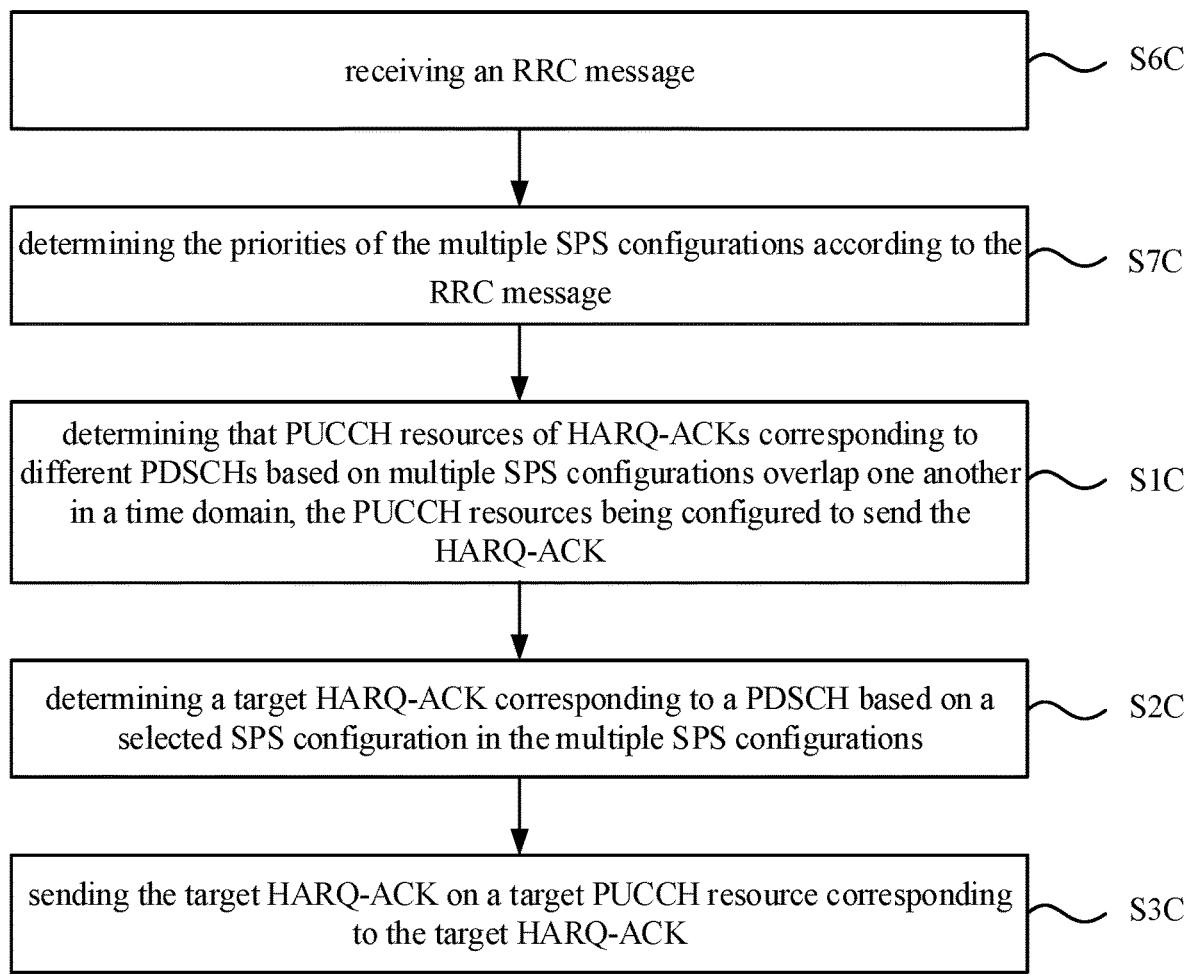
FIG. 8 is a flow diagram of another HARQ-ACK sending method according to an example of the disclosure.

FIG. 8 is a flow diagram of another HARQ-ACK sending method according to an example of the disclosure. As shown in FIG. 8, before determining that PUCCH resources of HARQ-ACKs for different PDSCHs configured based on multiple SPS configurations overlap one another in a time domain, the method further includes:

S6C, receiving an RRC message; and

S7C, determining the priorities of the multiple SPS configurations according to the RRC message.

In one example, the base station may indicate the priorities of multiple SPS configurations through multiple RRC messages, and may indicate the priorities of different SPS configurations through different RRC messages. The terminal may determine the priorities of multiple SPS configurations according to the received RRC messages.

Figure 9:
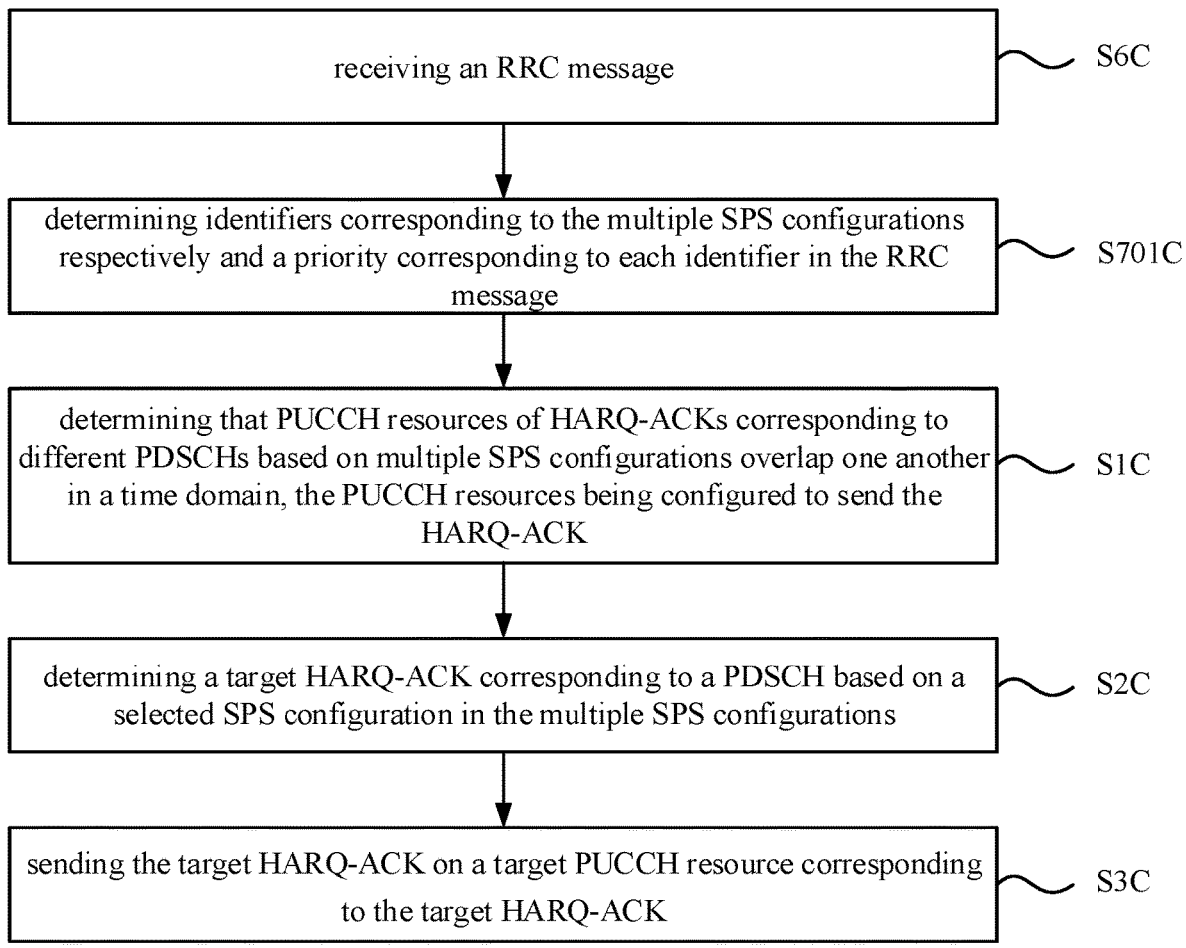
FIG. 9 is a flow diagram of another HARQ-ACK sending method according to an example of the disclosure.

FIG. 9 is a flow diagram of another HARQ-ACK sending method according to an example of the disclosure. As shown in FIG. 9, determining the priorities of the multiple SPS configurations according to the RRC message includes:

S701C, determining identifiers corresponding to the multiple SPS configurations respectively and a priority corresponding to each identifier in the RRC message.

In one example, the base station may directly set identifiers corresponding to multiple SPS configurations and priorities corresponding to each identifier in the RRC message, so as to explicitly indicate the priorities of the SPS configurations. The terminal may directly determine the priority of each SPS configuration according to the content in the RRC message.

Figure 10:
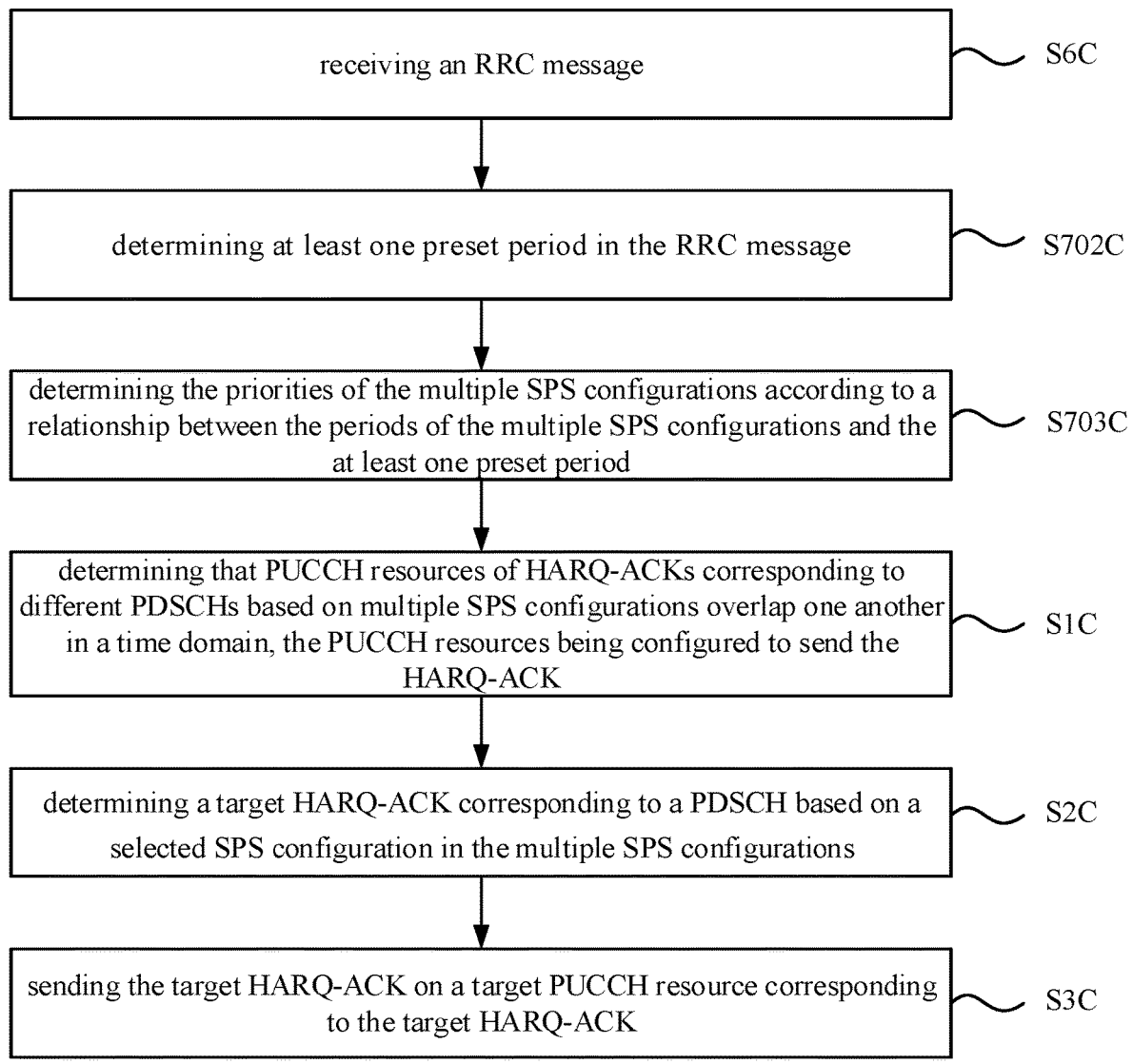
FIG. 10 is a flow diagram of another HARQ-ACK sending method according to an example of the disclosure.

FIG. 10 is a flow diagram of another HARQ-ACK sending method according to an example of the disclosure. As shown in FIG. 10, determining the priorities of the multiple SPS configurations according to the RRC message includes:

S702C, determining at least one preset period in the RRC message; and

S703C, determining the priorities of the multiple SPS configurations according to a relationship between the periods of the multiple SPS configurations and the at least one preset period.

In one example, the base station may carry at least one preset period in the RRC message, implicitly indicating the priority of the SPS configuration. Since the terminal has been configured with multiple SPS configurations, the periods of multiple SPS configurations may be determined, and the priorities of the multiple SPS configurations may be determined according to the relationship between the periods of the SPS configurations and at least one preset period. For example, if the at least one preset period is two preset periods Ta and Tb, Ta>Tb, then the terminal may determine that SPS configurations with periods shorter than Tb have the highest priority, SPS configurations with periods between Ta and Tb have the second highest priority, and SPS configurations with periods greater than Ta have the lowest priority.

Figure 11:
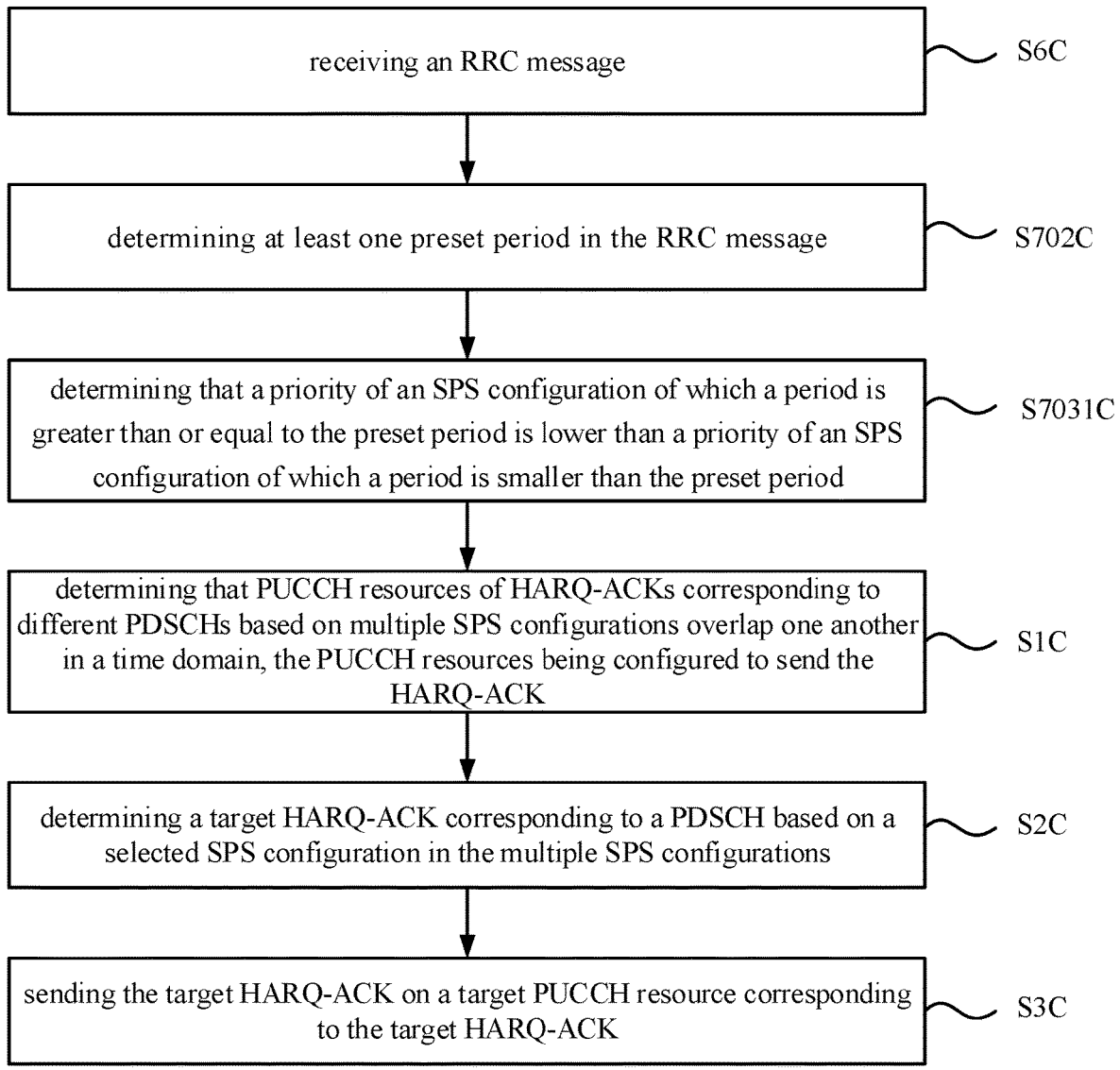
FIG. 11 is a flow diagram of another HARQ-ACK sending method according to an example of the disclosure.

FIG. 11 is a flow diagram of another HARQ-ACK sending method according to an example of the disclosure. As shown in FIG. 11, the multiple SPS configurations are two SPS configurations, the at least one preset period is one preset period, and determining the priorities of the multiple SPS configurations according to the relationship between the periods of the multiple SPS configurations and the at least one preset period includes:

S7031C, determining that a priority of an SPS configuration of which a period is greater than or equal to the preset period is lower than a priority of an SPS configuration of which a period is shorter than the preset period.

In one example, when the terminal is configured with two SPS configurations, and there is only one preset period in the RRC message, the terminal may determine that a priority of an SPS configuration of which a period is greater than or equal to the preset period is lower than a priority of an SPS configuration of which a period is shorter than the preset period.

Figure 12:
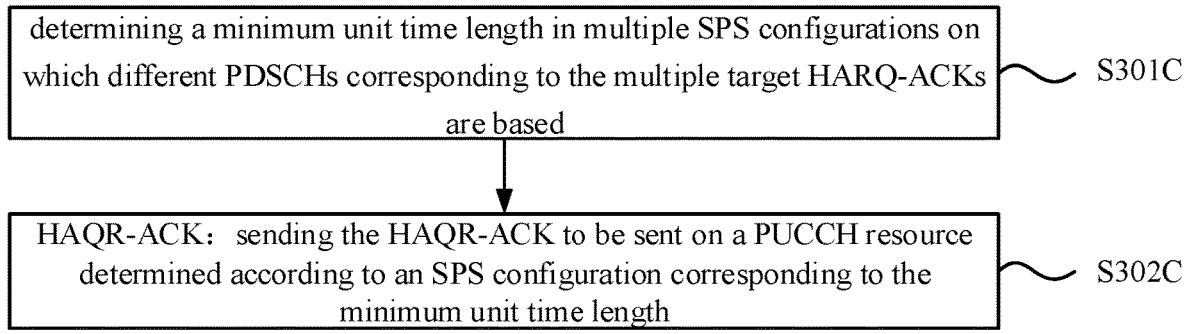
FIG. 12 is a flow diagram of sending the target HARQ-ACK on a target PUCCH resource corresponding to the target HARQ-ACK according to an example of the disclosure.

FIG. 12 is a flow diagram of sending the target HARQ-ACK on a target PUCCH resource corresponding to the target HARQ-ACK according to an example of the disclosure. As shown in FIG. 12, in response to there are multiple target HARQ-ACKs, sending the target HARQ-ACK on the target PUCCH resource corresponding to the target HARQ-ACK includes:

S301C, determining a minimum unit time length in multiple SPS configurations on which different PDSCHs corresponding to the multiple target HARQ-ACKs are based, the terminal calculating a time interval between receiving time of a PDSCH corresponding to an HARQ-ACK to be sent and sending time of the HARQ-ACK to be sent according to a preset coefficient and the unit time length; and S302C, sending the HAQR-ACK to be sent on a PUCCH resource determined according to an SPS configuration corresponding to the minimum unit time length.

In one example, multiple target HARQ-ACKs may be determined in multiple SPS configurations. For example, in response to there are SPS configurations with the same priority, multiple SPS configurations with the highest priority may be determined, so as to determine multiple target HARQ-ACKs.

In this case, a minimum unit time length may be determined in multiple SPS configurations on which different PDSCHs corresponding to multiple target HARQ-ACKs are based, and the unit time length is used by the terminal to calculate the time interval with the preset coefficient k1.

Since the time interval calculated based on the minimum unit time length is the smallest, the SPS configuration corresponding to the minimum unit time length is most likely to be configured for the terminal for the services with lower allowable delays, so the HAQR-ACK to be sent may be sent on the PUCCH resource determined according to the SPS configuration corresponding to the minimum unit time length, so as to ensure that the HAQR-ACK of the services with lower allowable delays may be sent to the base station in time.

For example, if the unit time length in one SPS configuration is slot, the unit time length in another SPS configuration is sub-slot, and the priorities of the two SPS configurations are equal, then the SPS configuration of which the unit time length is sub-slot may be determined, and the HAQR-ACK to be sent may be sent on the PUCCH resource determined according to the SPS configuration.

Figure 13:
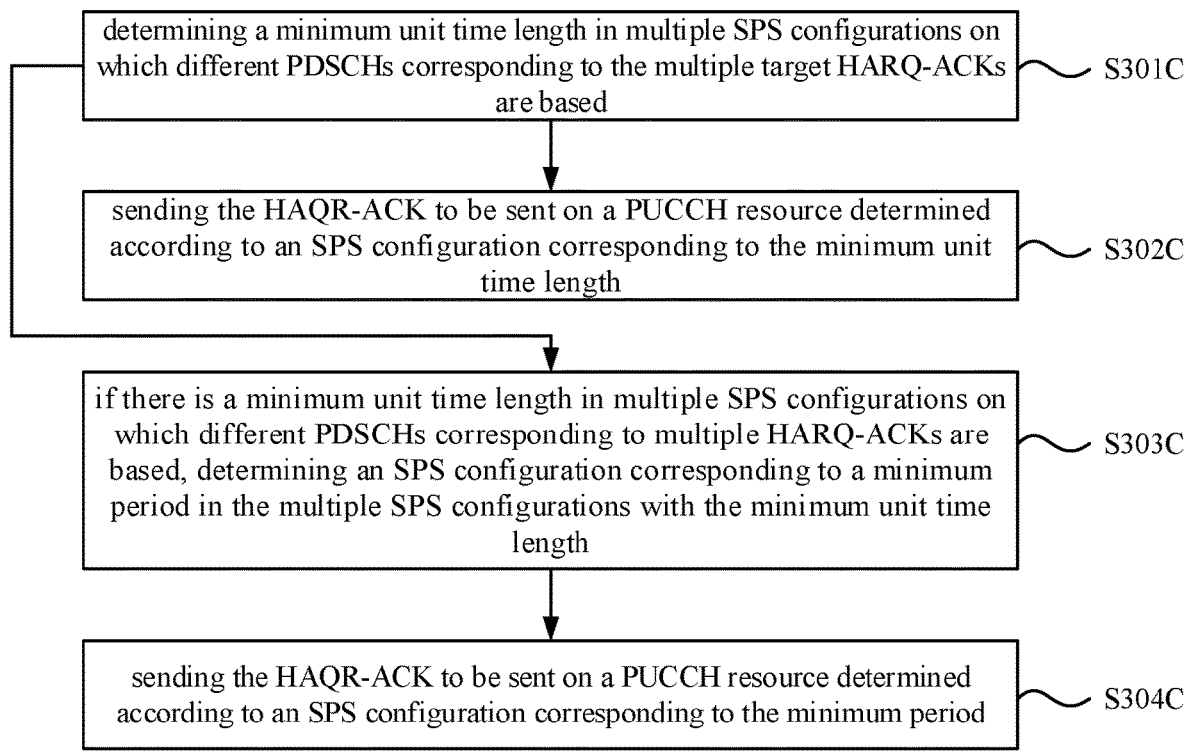
FIG. 13 is another flow diagram of sending the target HARQ-ACK on a target PUCCH resource corresponding to the target HARQ-ACK according to an example of the disclosure.

FIG. 13 is another flow diagram of sending the target HARQ-ACK on a target PUCCH resource corresponding to the target HARQ-ACK according to an example of the disclosure. As shown in FIG. 13, in response to there is a minimum unit time length in multiple SPS configurations on which different PDSCHs corresponding to multiple HARQ-ACKs are based, sending the target HARQ-ACK on the target PUCCH resource corresponding to the target HARQ-ACK further includes:

S303C, determining an SPS configuration corresponding to a minimum period in the multiple SPS configurations with the minimum unit time length; and S304C, sending the HAQR-ACK to be sent on a PUCCH resource determined according to an SPS configuration corresponding to the minimum period.

In one example, in response to there is a minimum unit time length in multiple SPS configurations on which different PDSCHs corresponding to multiple HARQ-ACKs are based, the SPS configuration corresponding to the minimum period may be determined in the multiple SPS configurations with the minimum unit time length.

Since the period of the SPS configuration determines the time interval for the terminal to receive the PDSCH, based on the SPS configuration corresponding to the minimum period, the time interval for the terminal to receive the PDSCH is the shortest, which is more likely to meet the needs of services with lower allowable delays. The SPS configuration corresponding to the minimum period is most likely to be configured for the terminal for services with lower allowable delays, so the HAQR-ACK to be sent may be sent on the PUCCH resource determined according to the SPS configuration corresponding to the minimum period, so as to ensure that the HAQR-ACK of the services with lower allowable delays may be sent to the base station in time.

Figure 14:
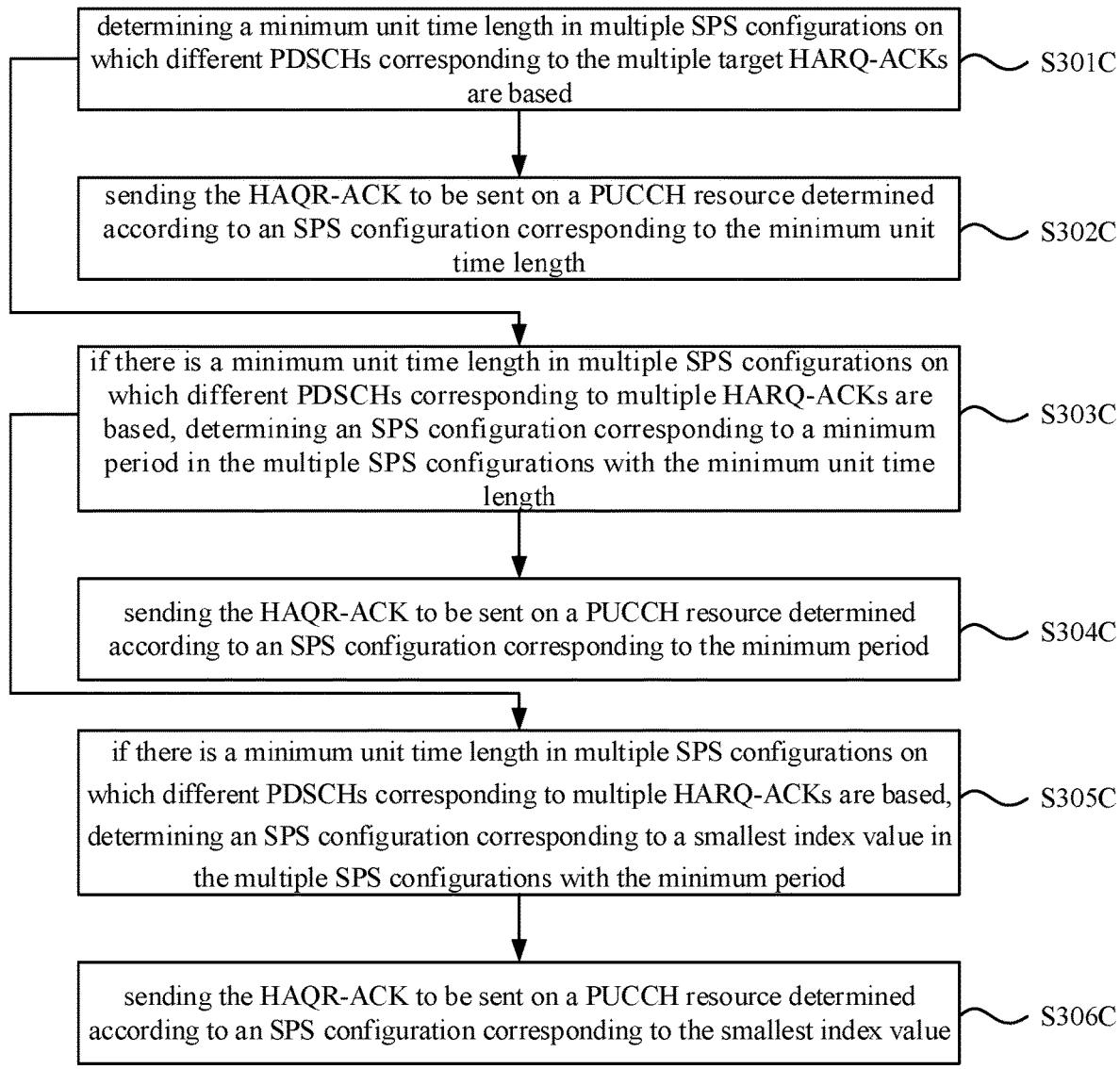
FIG. 14 is another flow diagram of sending the target HARQ-ACK on a target PUCCH resource corresponding to the target HARQ-ACK according to an example of the disclosure.

FIG. 14 is another flow diagram of sending the target HARQ-ACK on a target PUCCH resource corresponding to the target HARQ-ACK according to an example of the disclosure. As shown in FIG. 14, in response to multiple SPS configurations have a minimum period, sending the target HARQ-ACK on the target PUCCH resource corresponding to the target HARQ-ACK further includes:

S305C, determining an SPS configuration corresponding to a smallest index value in the multiple SPS configurations with the minimum period; and S306C, sending the HAQR-ACK to be sent on a PUCCH resource determined according to an SPS configuration corresponding to the smallest index value.

In one example, in response to multiple SPS configurations have a minimum period, the SPS configuration corresponding to the smallest index value may be determined in the multiple SPS configurations with the minimum period, and then the HAQR-ACK to be sent may be sent on the PUCCH resource determined according to the SPS configuration corresponding to the smallest index value.

Figure 15:
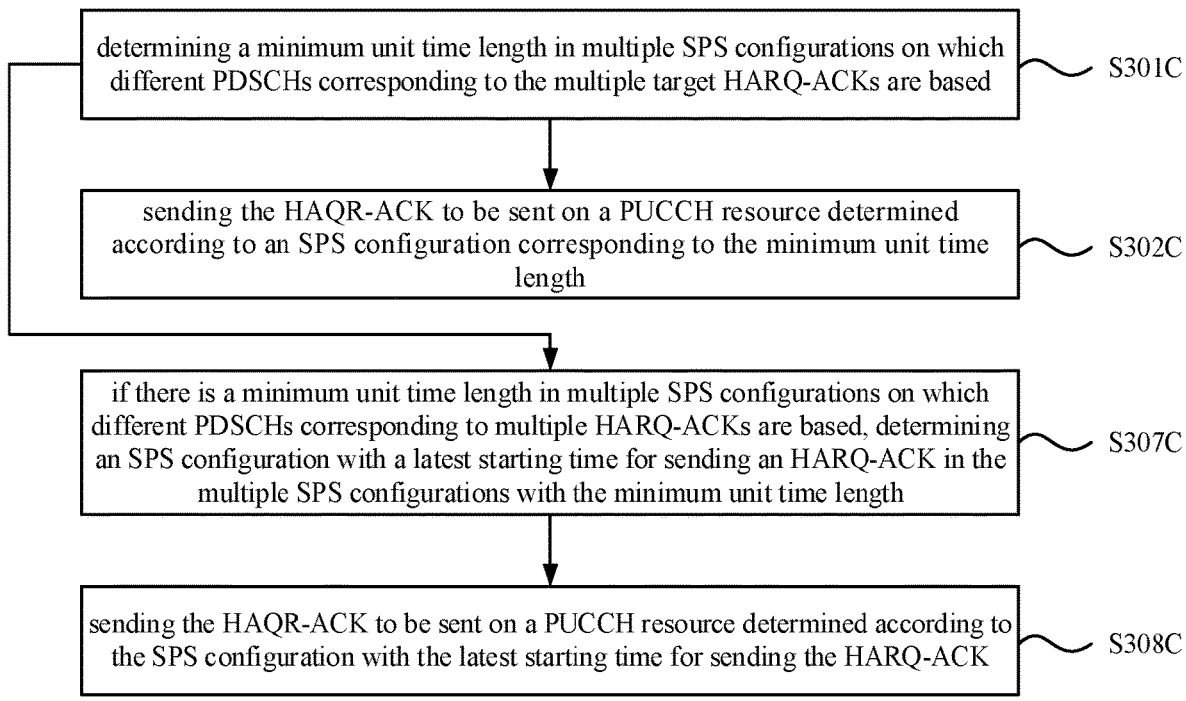
FIG. 15 is another flow diagram of sending the target HARQ-ACK on a target PUCCH resource corresponding to the target HARQ-ACK according to an example of the disclosure.

FIG. 15 is another flow diagram of sending the target HARQ-ACK on a target PUCCH resource corresponding to the target HARQ-ACK according to an example of the disclosure. As shown in FIG. 15, in response to there is a minimum unit time length in multiple SPS configurations on which different PDSCHs corresponding to multiple HARQ-ACKs are based, sending the target HARQ-ACK on the target PUCCH resource corresponding to the target HARQ-ACK further includes:

S307C, determining an SPS configuration with a latest starting time for sending an HARQ-ACK in the multiple SPS configurations with the minimum unit time length; and S308C, sending the HAQR-ACK to be sent on a PUCCH resource determined according to the SPS configuration with the latest starting time for sending the HARQ-ACK.

In one example, in response to there is a minimum unit time length in multiple SPS configurations on which different PDSCHs corresponding to multiple HARQ-ACKs are based, the SPS configuration with the latest starting time for sending the HARQ-ACK may be determined in the multiple SPS configurations with the minimum unit time length.

Then the HAQR-ACK to be sent is sent on the PUCCH resource determined according to the SPS configuration with the latest starting time for sending the HARQ-ACK, so as to ensure that the reception of all PDSCHs has been completed when the HAQR-ACK is sent at the latest starting time, which ensures that the sent HAQR-ACK may fully reflect the reception of PDSCHs.

Figure 16:
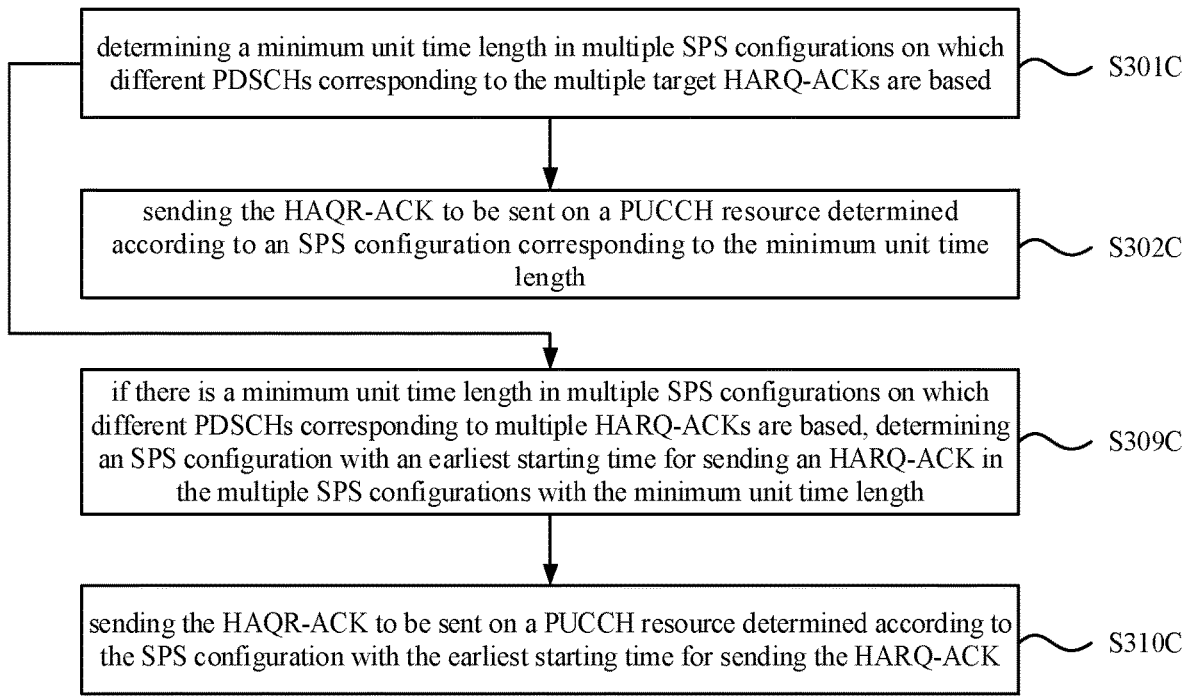
FIG. 16 is another flow diagram of sending the target HARQ-ACK on a target PUCCH resource corresponding to the target HARQ-ACK according to an example of the disclosure.

FIG. 16 is another flow diagram of sending the target HARQ-ACK on a target PUCCH resource corresponding to the target HARQ-ACK according to an example of the disclosure. As shown in FIG. 16, in response to there is a minimum unit time length in multiple SPS configurations on which different PDSCHs corresponding to multiple HARQ-ACKs are based, sending the target HARQ-ACK on the target PUCCH resource corresponding to the target HARQ-ACK further includes:

S309C, determining an SPS configuration with an earliest starting time for sending an HARQ-ACK in the multiple SPS configurations with the minimum unit time length; and S310C, sending the HAQR-ACK to be sent on a PUCCH resource determined according to the SPS configuration with the earliest starting time for sending the HARQ-ACK.

In one example, in response to there is a minimum unit time length in multiple SPS configurations on which different PDSCHs corresponding to multiple HARQ-ACKs are based, the SPS configuration with the earliest starting time for sending the HARQ-ACK may be determined in the multiple SPS configurations with the minimum unit time length.

Then the HAQR-ACK to be sent is sent on the PUCCH resource determined according to the SPS configuration with the earliest starting time of sending the HARQ-ACK, so as to ensure that the HARQ-ACK can be sent to the base station as soon as possible, which meets the requirements of services for delays from receiving PDSCH to sending the HARQ-ACK.

According to the example of the disclosure, a selected SPS configuration may be determined in the multiple SPS configurations, then the target HARQ-ACK for the PDSCH based on the selected SPS configuration may be determined, and then the target HARQ-ACK may be sent on the PUCCH resource corresponding to the target HARQ-ACK, ensuring that the terminal selects an HARQ-ACK to send out.

FIG. 17 is a flow diagram of a priority indication method according to an example of the disclosure. The priority indication method described in this example may be applied to a base station, which may communicate with a terminal, and the terminal includes but is not limited to a mobile phone, a tablet computer, a wearable device and other electronic devices. The base station and the terminal may communicate based on 4G LTE or 5G NR.

As shown in FIG. 17, the priority indication method may include the following steps:

S1D, sending priority indication information to a terminal, the terminal is configured with multiple SPS configurations, and the priority indication information is configured to indicate priorities of the multiple SPS configurations.

In one example, when the base station configures multiple SPS configurations for the terminal, the base station may periodically send PDSCHs to the terminal based on the periods of the SPS configurations, and correspondingly, the terminal may periodically receive SPS sent by the base station based on the periods of the SPS configurations.

The terminal may receive different PDSCHs based on each SPS configuration, and may send HARQ-ACKs to the base station based on reception results of each PDSCH. Because sending HARQ needs to occupy PUCCH resources, PDCCHs of HARQ-ACKs for PDSCHs configured based on different SPS configurations may overlap one another in a time domain.

In this case, since the PUCCH resources occupied by different HARQ-ACKs overlap one another in the time domain, two HARQ-ACKs cannot be sent at the same time on overlapping time domain resources.

Based on this example, the base station may indicate the priorities of multiple SPS configurations to the terminal, so that the terminal may determine the selected SPS configuration (for example, the SPS configuration with the highest priority) according to the priorities, so as to determine the target HARQ-ACK for the PDSCH based on the selected SPS configuration (that is, the PDSCH received by the terminal based on the period of the selected SPS configuration), and then send the target HARQ-ACK on the PUCCH resource corresponding to the target HARQ-ACK. In this way, it is ensured that the terminal selects an HARQ-ACK to send out according to the priority of the SPS configuration.

FIG. 18 is a flow diagram of another priority indication method according to an example of the disclosure. As shown in FIG. 18, before sending the priority indication information to the terminal, the method further includes:

S2D, determining periods of the multiple SPS configurations configured for the terminal; and S3D, generating the priority indication information according to the periods, the shorter the period, the higher a priority of an SPS configuration corresponding to the period.

In one example, higher priorities may be set for SPS configurations with shorter periods, and lower priorities may be set for SPS configurations with longer periods. SPS configurations with shorter periods are generally aimed at services with lower allowable delays, and SPS configurations with longer periods are generally aimed at services with larger allowable delays.

It is ensured that when PUCCH resources of different HARQ-Acks overlap one another in the time domain, the terminal sends an HARQ-ACK for a service with a lowest allowable delay through the PUCCH resources in the overlapping time domains, so as to ensure the delay from receiving the PDSCH to sending the HARQ-ACK, and meet the requirements of services for delays as much as possible.

Corresponding to the aforementioned examples of the method for determining time interval, the time interval indication method, the HARQ-ACK sending method and the priority indication method, the disclosure also provides examples of a time interval determination device, a time interval indication device, an HARQ-ACK sending device and a priority indication device.

According to the example of the disclosure, the base station may indicate the priorities of multiple SPS configurations to the terminal, so that the terminal determines the selected SPS configuration according to the priorities, determining the target HARQ-ACK for the PDSCH based on the selected SPS configuration, so as to send the target HARQ-ACK on the PUCCH resource corresponding to the target HARQ-ACK. In this way, it is ensured that the terminal selects an HARQ-ACK to send out according to the priorities of the SPS configurations.

FIG. 19 is a block diagram of a time interval determination device according to an example of the disclosure. The time interval determination device described in this example can be applied to a terminal, which includes but is not limited to a mobile phone, a tablet computer, a wearable device and other electronic devices. The terminal can be used as user equipment (UE) to communicate with a base station based on 4G LTE or 5G NR.

As shown in FIG. 19, the time interval determination device may include:

a configuration receiving module 1A configured to receive a plurality of SPS configurations, different SPS configurations having different periods; and an interval determination module 2A configured to determine a time interval between receiving time of a PDSCH of each of the SPS configurations and sending time of an HARQ-ACK for the PDSCH according to a corresponding period in each of the SPS configurations, the corresponding period is positively correlated with the time interval.

Optionally, the interval determination module 2A is configured to determine that the time interval is equal to a first time length when the period is shorter than a preset time length, and determine that the time interval is equal to a second time length when the period is greater than or equal to the preset time length, and the first time length is shorter than the second time length.

Optionally, the interval determination module 2A is configured to calculate the first time length according to a preset coefficient and a first unit time length, and calculate the second time length according to the preset coefficient and a second unit time length, and the first unit time length is shorter than the second unit time length.

Optionally, the first unit time length is a sub-slot, and the second unit time length is a slot.

FIG. 20 is a block diagram of a time interval indication device according to an example of the disclosure. The time interval indication device described in this example may be applied to a base station, which may communicate with a terminal, and the terminal includes but is not limited to a mobile phone, a tablet computer, a wearable device and other electronic devices. The base station and the terminal may communicate based on 4G LTE or 5G NR.

As shown in FIG. 20, the time interval indication device may include:

a sending module 1B configured to send a plurality of SPS configurations and indication information to a terminal, different SPS configurations having different periods, the indication information being configured to indicate the terminal to determine a time interval between receiving time of a PDSCH and sending time of an HARQ-ACK for the PDSCH according to the period of each of the SPS configurations, and the period being positively correlated with the time interval.

Optionally, the indication information is configured to indicate the terminal to determine that a first time interval between receiving time of a first PDSCH and sending time of an HARQ-ACK for the first PDSCH is a first time length, and/or a second time interval between receiving time of a second PDSCH and sending time of an HARQ-ACK for the second PDSCH is a second time length, the first PDSCH is based on a first SPS configuration, and the second PDSCH is based on a second SPS configuration; and a period of the first SPS configuration is shorter than a preset time length, a period of the second SPS configuration is greater than or equal to the preset time length, and the first time length is shorter than the second time length.

Optionally, the indication information is configured to indicate the terminal to calculate the first time length according to a preset coefficient and a first unit time length, and/or to calculate the second time length according to the preset coefficient and a second unit time length, and the first unit time length is shorter than the second unit time length.

Optionally, the first unit time length is a sub-slot, and the second unit time length is a slot.

Optionally, the indication information is also configured to indicate the first SPS configuration and/or the second SPS configuration.

Figure 21:
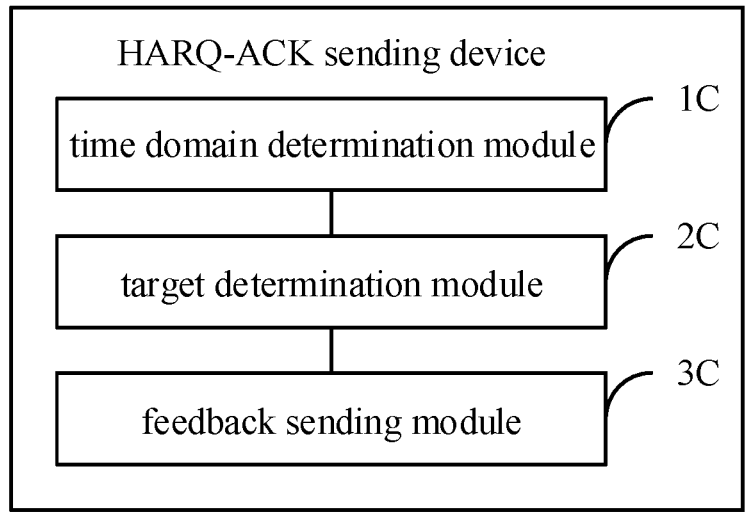
FIG. 21 is a block diagram of an HARQ-ACK sending device according to an example of the disclosure.

FIG. 21 is a block diagram of an HARQ-ACK sending device according to an example of the disclosure. The HARQ-ACK sending device described in this example can be applied to a terminal, which includes but is not limited to a mobile phone, a tablet computer, a wearable device and other electronic devices. The terminal can be used as user equipment (UE) to communicate with a base station based on 4G LTE or 5G NR.

As shown in FIG. 21, the HARQ-ACK sending device may include:

a time domain determination module 1C configured to determine that PUCCH resources of HARQ-ACKs for different PDSCHs configured based on multiple SPS configurations overlap one another in a time domain, the PUCCH resources being configured to send the HARQ-ACKs;

a target determination module 2C configured to determine a target HARQ-ACK for a PDSCH based on a selected SPS configuration in the multiple SPS configurations; and a feedback sending module 3C configured to send the target HARQ-ACK on a target PUCCH resource corresponding to the target HARQ-ACK.

Optionally, the target determination module 2C is configured to determine a SPS configuration with a highest priority as the selected SPS configuration according to the priorities of the multiple SPS configurations; and determine a target HARQ-ACK for a PDSCH based on the selected SPS configuration.

Figure 22:
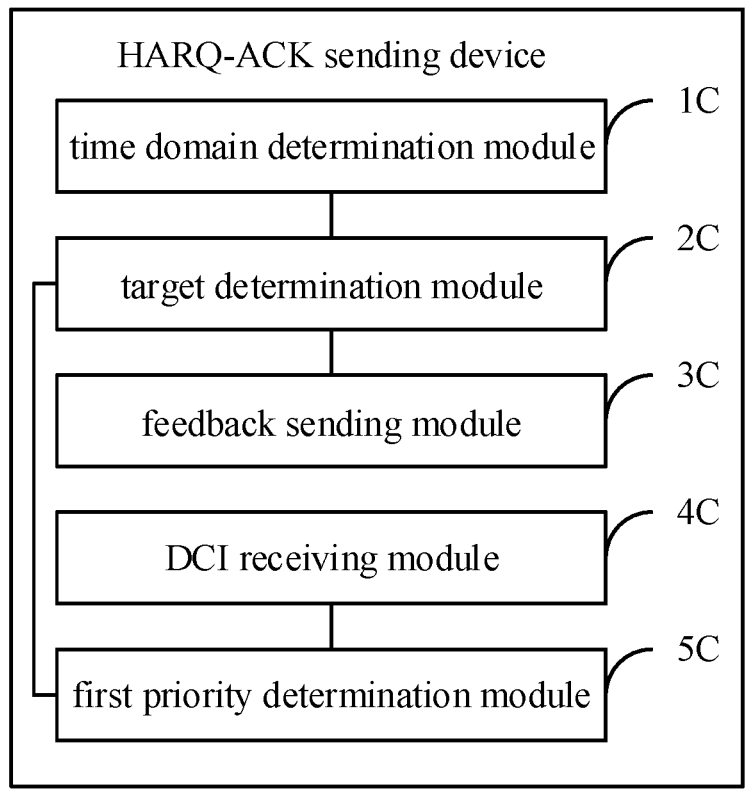
FIG. 22 is a block diagram of another HARQ-ACK sending device according to an example of the disclosure.

FIG. 22 is a block diagram of another HARQ-ACK sending device according to an example of the disclosure. As shown in FIG. 22, the device further includes:

a DCI receiving module 4C configured to receive multiple activated DCIs; and a first priority determination module 5C configured to determine the priorities of the multiple SPS configurations according to the multiple activated DCIs, different activated DCIs being configured to indicate the priorities of PDSCHs corresponding to different SPS configurations.

Optionally, the first priority determination module is configured to determine the priorities of the multiple SPS configurations according to information in a preset information field of the multiple activated DCIs.

Optionally, the first priority determination module is configured to determine the priorities of the multiple SPS configurations according to the formats of the multiple activated DCIs, and/or a type of a control resource set and/or a type of a search space.

Figure 23:
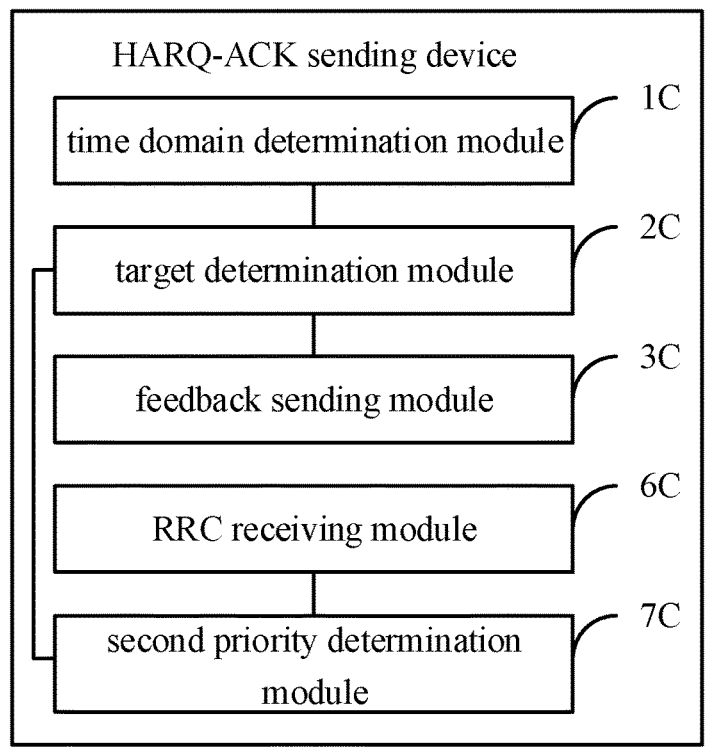
FIG. 23 is a block diagram of another HARQ-ACK sending device according to an example of the disclosure.

FIG. 23 is a block diagram of another HARQ-ACK sending device according to an example of the disclosure. As shown in FIG. 23, the device further includes:

an RRC receiving module 6C configured to receive an RRC message; and a second priority determination module 7C configured to determine the priorities of the multiple SPS configurations according to the RRC message.

Optionally, the second priority determination module is configured to determine identifiers corresponding to the multiple SPS configurations respectively and a priority corresponding to each identifier in the RRC message.

Optionally, the second priority determination module is configured to determine at least one preset period in the RRC message; and determine the priorities of the multiple SPS configurations according to the relationship between the periods of the multiple SPS configurations and the at least one preset period.

Optionally, the multiple SPS configurations are two SPS configurations, the at least one preset period is one preset period, and the second priority determination module is configured to determine that a priority of an SPS configuration of which a period is greater than or equal to the preset period is lower than a priority of an SPS configuration of which a period is shorter than the preset period.

Optionally, in response to there are multiple target HARQ-ACKs, the feedback sending module is configured to determine a minimum unit time length in multiple SPS configurations on which different PDSCHs corresponding to the multiple target HARQ-ACKs are based, the terminal calculating a time interval between receiving time of a PDSCH corresponding to an HARQ-ACK to be sent and sending time of the HARQ-ACK to be sent according to a preset coefficient and the unit time length; and send the HAQR-ACK to be sent on a PUCCH resource determined according to an SPS configuration corresponding to the minimum unit time length.

Optionally, in response to there is a minimum unit time length in multiple SPS configurations on which different PDSCHs corresponding to multiple HARQ-ACKs are based, the feedback sending module is configured to determine an SPS configuration corresponding to a minimum period in the multiple SPS configurations with the minimum unit time length; and send the HAQR-ACK to be sent on a PUCCH resource determined according to an SPS configuration corresponding to the minimum period.

Optionally, in response to multiple SPS configurations have a minimum period, the feedback sending module is configured to determine the SPS configuration corresponding to the smallest index value in the multiple SPS configurations with the minimum period; and send the HAQR-ACK to be sent on the PUCCH resource determined according to the SPS configuration corresponding to the smallest index value.

Optionally, in response to there is a minimum unit time length in multiple SPS configurations on which different PDSCHs corresponding to multiple HARQ-ACKs are based, the feedback sending module is configured to determine the SPS configuration with the latest starting time for sending the HARQ-ACK in the multiple SPS configurations with the minimum unit time length; and send the HAQR-ACK to be sent on a PUCCH resource determined according to the SPS configuration with the latest starting time for sending the HARQ-ACK.

Optionally, in response to there is a minimum unit time length in multiple SPS configurations on which different PDSCHs corresponding to multiple HARQ-ACKs are based, the feedback sending module is configured to determine the SPS configuration with the earliest starting time for sending the HARQ-ACK in the multiple SPS configurations with the minimum unit time length; and send the HAQR-ACK to be sent on a PUCCH resource determined according to the SPS configuration with the earliest starting time for sending the HARQ-ACK.

Figure 24:
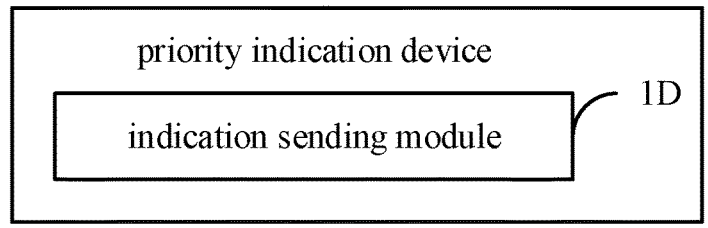
FIG. 24 is a block diagram of a priority indication device according to an example of the disclosure.

FIG. 24 is a block diagram of a priority indication device according to an example of the disclosure. The priority indication device described in this example may be applied to a base station, which may communicate with a terminal, and the terminal includes but is not limited to a mobile phone, a tablet computer, a wearable device and other electronic devices. The base station and the terminal may communicate based on 4G LTE or 5G NR.

As shown in FIG. 24, the priority indication device may include:

an indication sending module 1D configured to send priority indication information to a terminal, the terminal is configured with multiple SPS configurations, and the priority indication information is configured to indicate priorities of the multiple SPS configurations.

Figure 25:
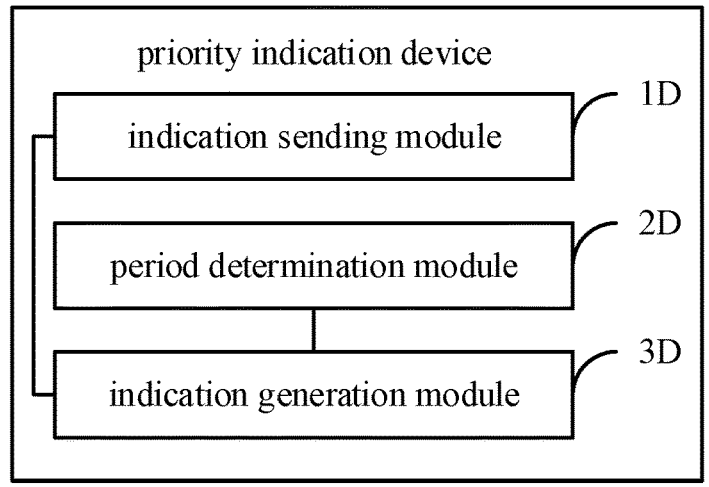
FIG. 25 is a block diagram of another priority indication device according to an example of the disclosure.

FIG. 25 is a block diagram of another priority indication device according to an example of the disclosure. As shown in FIG. 25, the device further includes:

a period determination module 2D configured to determine periods of the multiple SPS configurations configured for the terminal; and an indication generation module 3D configured to generate the priority indication information according to the periods, the shorter the period, the higher a priority of an SPS configuration corresponding to the period.

For the device in the above examples, the specific operating manner of each module has been described in detail in the method examples, and will not be described in detail here.

For device examples, since they basically correspond to the method examples, please refer to the description of the method examples for relevant information. The device examples described above are only schematic, the units described as separate parts may or may not be physically separated, and the parts displayed as units may or may not be physical units, i.e., may be located in one place or may be distributed over multiple network units. Some or all of the modules may be selected according to actual needs to achieve the purpose of the example. One of ordinary skill in the art can understand and implement it without creative labor.

An example of the disclosure further proposes electronic equipment, including:

a processor; and a memory for storing processor-executable instructions;

the processor being configured to implement the method for determining time interval described in any of the above examples.

An example of the disclosure further proposes electronic equipment, including:

a processor; and a memory for storing processor-executable instructions;

the processor being configured to implement the time interval indication method described in any of the above examples.

An example of the disclosure further proposes electronic equipment, including:

a processor; and a memory for storing processor-executable instructions;

the processor being configured to implement the HARQ-ACK sending method described in any of the above examples.

An example of the disclosure further proposes electronic equipment, including:

a processor; and a memory for storing processor-executable instructions;

the processor being configured to implement the priority indication method described in any of the above examples.

An example of the disclosure further proposes a computer-readable storage medium on which a computer program is stored is proposed, and the program, when executed by a processor, implements the steps of the method for determining time interval according to any one of claim 1 or 2.

An example of the disclosure further proposes a computer-readable storage medium on which a computer program is stored is proposed, and the program, when executed by a processor, implements the steps of the time interval indication method according to any of the above examples.

An example of the disclosure further proposes a computer-readable storage medium on which a computer program is stored is proposed, and the program, when executed by a processor, implements the steps of the HARQ-ACK sending method according to any of the above examples.

An example of the disclosure further proposes a computer-readable storage medium on which a computer program is stored is proposed, and the program, when executed by a processor, implements the steps of the priority indication method according to any of the above examples.

Figure 26:
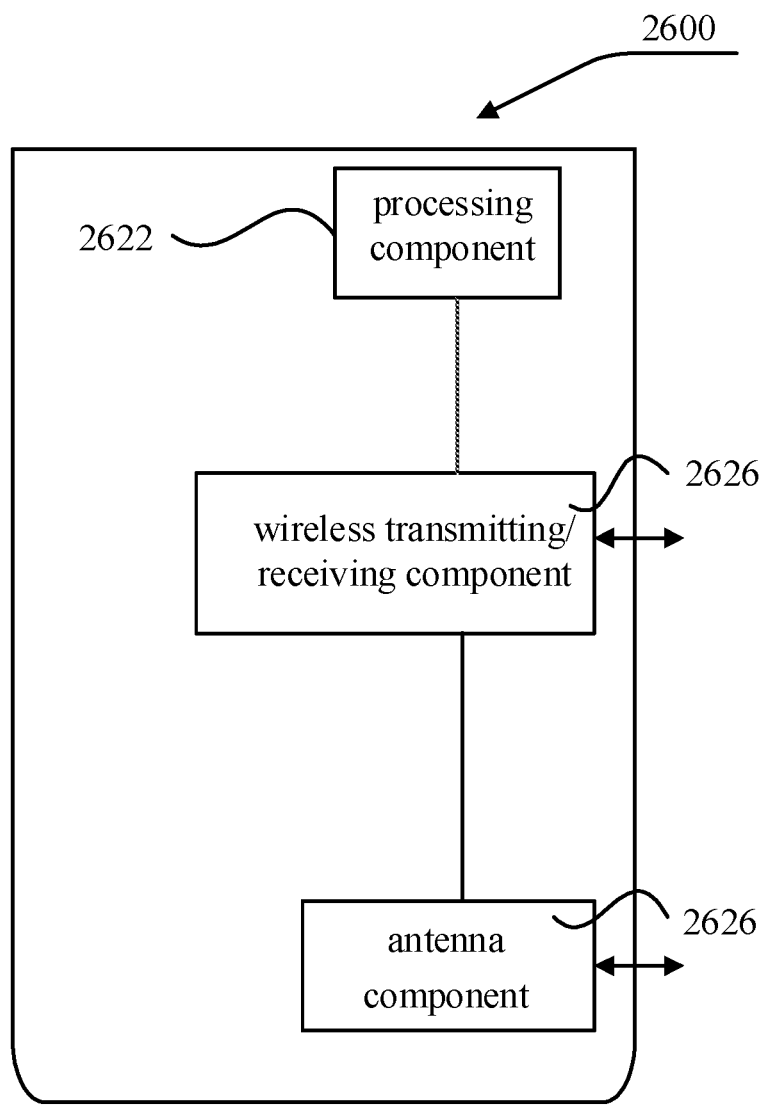
FIG. 26 is a structural diagram of a device according to an example of the disclosure.

As shown in FIG. 26, FIG. 26 is a structural diagram of a device 2600 according to an example of the disclosure. The device 2600 may be provided as a base station. Referring to FIG. 26, the device 2600 includes a processing component 2622, a wireless transmitting/receiving component 2624, an antenna component 2626, and a signal processing portion specific to a wireless interface, and the processing component 2622 may further include one or more processors. One of the processors in the processing component 2622 may be configured to implement the method for determining time interval described in any of the above examples, and/or the time interval indication method described in any of the above examples, and/or the HARQ-ACK sending method described in any of the above examples, and/or the priority indication method described in any of the above examples.

Figure 27:
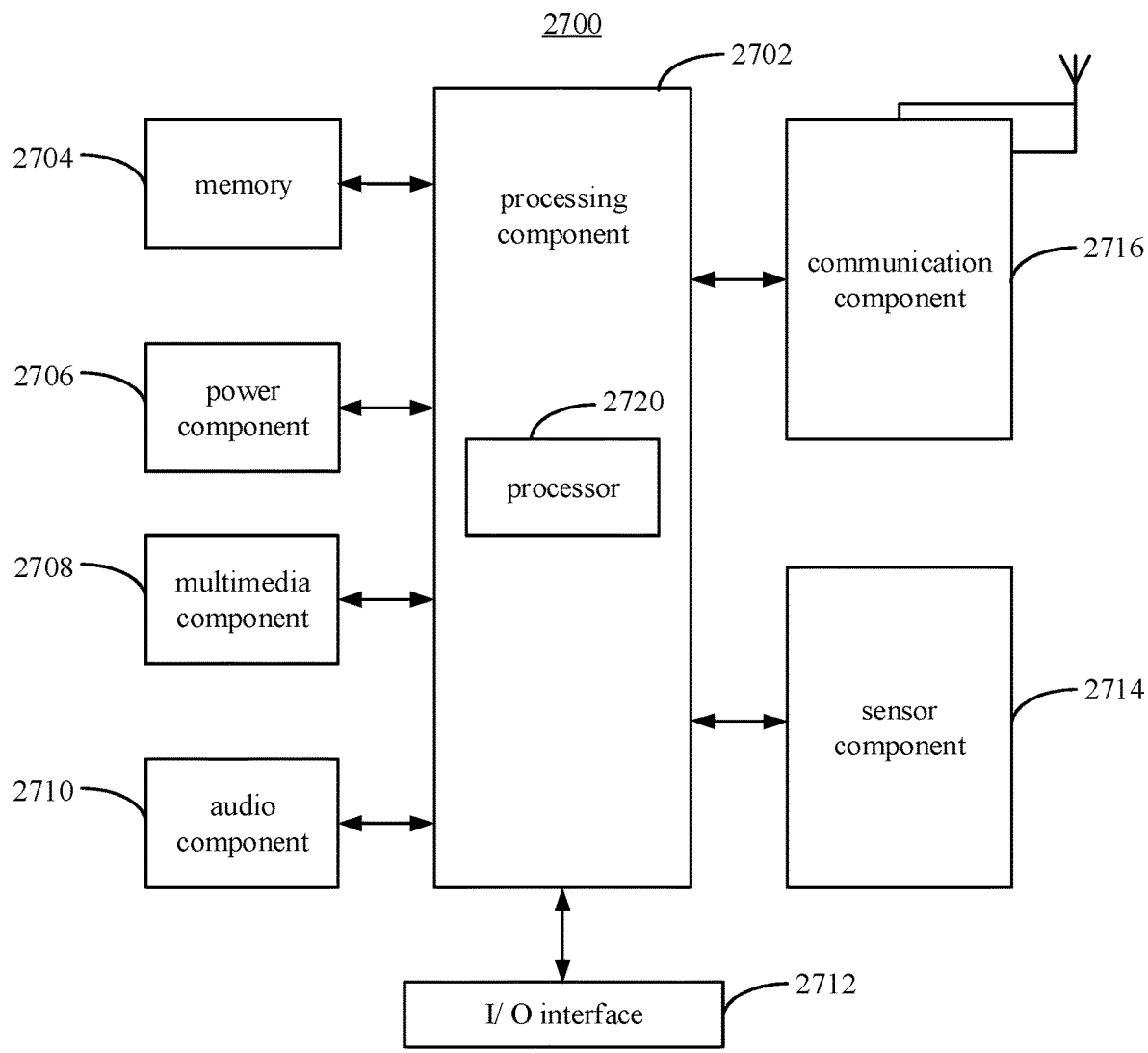
FIG. 27 is a structural diagram of a device according to an example of the disclosure.

FIG. 27 is a structural diagram of a device 2700 according to an example of the disclosure. For example, the device 2700 may be a mobile phone, a computer, a digital broadcast terminal, a messaging device, a game console, a tablet device, a medical device, a fitness device, a personal digital assistant, etc.

Referring to FIG. 27, the device 2700 may include one or more of the following components: a processing component 2702, a memory 2704, a power component 2706, a multimedia component 2708, an audio component 2710, an input/output (I/O) interface 2712, a sensor component 2714, and a communication component 2716.

The processing component 2702 generally controls the overall operation of the device 2700, such as operations associated with display, telephone calls, data communication, camera operations, and recording operations. The processing component 2702 may include one or more processors 2720 to execute instructions to complete all or part of the steps of the method for determining time interval described in any of the above examples, and/or the time interval indication method described in any of the above examples, and/or the HARQ-ACK sending method described in any of the above examples, and/or the priority indication method described in any of the above examples. In addition, the processing component 2702 may include one or more modules to facilitate interaction between the processing component 2702 and other components. For example, the processing component 2702 may include a multimedia module to facilitate interaction between the multimedia component 2708 and the processing component 2702.

The memory 2704 is configured to store various types of data to support operations at the device 2700. Examples of such data include instructions for any application or method running on the device 2700, contact data, phone book data, messages, pictures, videos, etc. The memory 2704 may be implemented by any type of volatile or nonvolatile storage device or a combination of them, such as Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), magnetic memory, flash memory, magnetic disk or optical disk.

The power component 2706 provides power for various components of the device 2700. The power component 2706 may include a power management system, one or more power supplies, and other components associated with generating, managing, and distributing power for the device 2700.

The multimedia component 2708 includes a screen which provides an output interface between the device 2700 and a user. In some examples, the screen may include a Liquid Crystal Display (LCD) and a Touch Panel (TP). If the screen includes a touch panel, the screen may be implemented as a touch screen so as to receive an input signal from the user.

The touch panel includes one or more touch sensors to sense touch, sliding, and gestures on the touch panel. The touch sensor may not only sense the boundary of the touch or sliding, but also detect the time length and pressure related to the touch or sliding. In some examples, the multimedia component 2708 includes a front camera and/or a rear camera. When the device 2700 is in an operation mode, such as a shooting mode or a video mode, the front camera and/or the rear camera may receive external multimedia data. The front camera and rear camera each can be a fixed optical lens system or have a focal length and optical zoom capability.

The audio component 2710 is configured to output and/or input audio signals. For example, the audio component 2710 includes a microphone (MIC) configured to receive external audio signals when the device 2700 is in an operating mode, such as a call mode, a recording mode, and a voice recognition mode. The received audio signals may be further stored in the memory 2704 or transmitted via the communication component 2716. In some examples, the audio component 2710 further includes a speaker for outputting the audio signals.

The I/O interface 2712 provides an interface between the processing component 2702 and peripheral interface modules, which may be keyboards, click wheels, buttons, etc. These buttons may include, but are not limited to, a home button, a volume button, a start button, and a lock button.

The sensor component 2714 includes one or more sensors configured to provide state evaluation for the device 2700 from various aspects. For example, the sensor component 2714 may detect the open/closed state of the device 2700, and the relative positioning of the components, such as a display and keypad of the device 2700; and the sensor component 2714 may also detect the position change of the device 2700 or a component of the device 2700, the presence or absence of user contact with the device 2700, the orientation or acceleration/deceleration of the device 2700, and the temperature change of the device 2700. The sensor component 2714 may include a proximity sensor configured to detect the presence of nearby objects without any physical contact. The sensor component 2714 may also include light sensors, such as CMOS or CCD image sensors, for use in imaging applications. In some examples, the sensor component 2714 may also include an acceleration sensor, a gyroscope sensor, a magnetic sensor, a pressure sensor, or a temperature sensor.

The communication component 2716 is configured to facilitate wired or wireless communication between the device 2700 and other equipment. The device 2700 may access a wireless network based on a communication standard, such as WiFi, 2G or 3G, 4G LTE, 5G NR or a combination of them. In an example, the communication component 2716 receives a broadcast signal or broadcast related information from an external broadcast management system via a broadcast channel. In an example, the communication component 2716 further includes a Near Field Communication (NFC) module to facilitate short-range communication. For example, the NFC module can be implemented based on the Radio Frequency Identification (RFID) technology, the Infrared Data Association (IrDA) technology, the Ultra-Wideband (UWB) technology, the Bluetooth (BT) technology and other technologies.

In an example, the device 2700 may be implemented by one or more Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic elements for performing the method for determining time interval described in any of the above examples, and/or the time interval indication method described in any of the above examples, and/or the HARQ-ACK sending method described in any of the above examples, and/or the priority indication method described in any of the above examples.

In an example, a non-transitory computer-readable storage medium including instructions is provided, such as a memory 2704 including instructions, which can be executed by the processors 2720 of the device 2700 to complete the above method. For example, the non-transitory computer-readable storage medium may be a ROM, a Random Access Memory (RAM), a CD-ROM, a magnetic tape, a floppy disk, an optical data storage device, etc.

Other examples of the disclosure will readily occur to those skilled in the art upon consideration of the specification and practice of the disclosure disclosed herein. The disclosure is intended to cover any variation, use or adaptation of the disclosure, which follows the general principles of the disclosure and includes common knowledge or conventional technical means in the technical field not disclosed in the disclosure. The specification and examples are to be considered as example only, with the true scope and spirit of the disclosure being indicated by the following claims.

It should be understood that the disclosure is not limited to the precise structure already described above and shown in the drawings, and various modifications and changes may be made without departing from the scope of them. The scope of the disclosure is limited only by the appended claims.

It should be noted that herein, relational terms such as first and second are only used to distinguish one entity or operation from another entity or operation, and do not necessarily require or imply any such actual relationship or order between these entities or operations. The term "include" or any other variation of them is intended to cover a non-exclusive inclusion, such that a process, method, article, or device which includes a list of elements does not include only those elements but also other elements not expressly listed or inherent to such process, method, article, or device. Without further limitation, an element defined by the statement "includes a . . . " does not exclude the presence of another identical element in a process, method, article or device that includes the element.

The methods and devices provided by the examples of the disclosure are described in detail above. Specific examples are applied herein to illustrate the principle and implementation of the disclosure. The above examples are only used to help understand the method of the disclosure and its core ideas. For those of ordinary skill in the art, according to the idea of this disclosure, there will be some changes in the specific implementation and application scope. To sum up, the contents of this specification should not be understood as a limitation of this disclosure.

What is claimed is:

1. A method for determining time interval, comprising:
    receiving, by a terminal, a plurality of semi-persistent scheduling (SPS) configurations, different SPS configurations having different periods; and
    determining, by the terminal, a time interval between receiving time of a physical downlink shared channel (PDSCH) of each of the SPS configurations and sending time of a hybrid automatic repeat request-acknowledgement (HARQ-ACK) for the PDSCH according to a corresponding period in each of the SPS configurations, wherein the corresponding period is positively correlated with the time interval.

2. The method according to claim 1, wherein determining the time interval between the receiving time of the PDSCH of each of the SPS configurations and the sending time of the HARQ-ACK for the PDSCH according to the corresponding period comprises:
determining that the time interval is equal to a first time length when the period is shorter than a preset time length, and determining that the time interval is equal to a second time length when the period is greater than or equal to the preset time length,
wherein the first time length is shorter than the second time length.

3. The method according to claim 2, wherein determining that the time interval is equal to the first time length comprises:
calculating the first time length according to a preset coefficient and a first unit time length;
determining that the time interval is equal to the second time length comprises:
calculating the second time length according to the preset coefficient and a second unit time length;
wherein the first unit time length is shorter than the second unit time length.

4. The method according to claim 3, wherein the first unit time length is a sub-slot, and the second unit time length is a slot.

5. A time interval indication method, comprising:
sending, by a base station, a plurality of semi-persistent scheduling (SPS) configurations and indication information to a terminal, different SPS configurations having different periods, the indication information being configured to indicate the terminal to determine a time interval between receiving time of a physical downlink shared channel (PDSCH) and sending time of a hybrid automatic repeat request-acknowledgement (HARQ-ACK) for the PDSCH according to the period of each of the SPS configurations, and the period being positively correlated with the time interval.

6. The method according to claim 5, wherein the indication information is configured to indicate the terminal to determine that a first time interval between receiving time of a first PDSCH and sending time of an HARQ-ACK for the first PDSCH is a first time length, or a second time interval between receiving time of a second PDSCH and sending time of an HARQ-ACK for the second PDSCH is a second time length,
wherein the first PDSCH is based on a first SPS configuration, and the second PDSCH is based on a second SPS configuration; and a period of the first SPS configuration is shorter than a preset time length, a period of the second SPS configuration is greater than or equal to the preset time length, and the first time length is shorter than the second time length.

7. The method according to claim 6, wherein the indication information is configured to indicate the terminal to calculate the first time length according to a preset coefficient and a first unit time length, and/or to calculate the second time length according to the preset coefficient and a second unit time length,
wherein the first unit time length is shorter than the second unit time length.

8. The method according to claim 7, wherein the first unit time length is a sub-slot, and the second unit time length is a slot.

9. A hybrid automatic repeat request-acknowledgement (HARQ-ACK) sending method, wherein the method is applicable to a terminal configured with multiple semi-persistent scheduling (SPS) configurations, and comprises:
determining that physical uplink control channel (PUCCH) resources of HARQ-ACKs for different PDSCHs configured based on multiple SPS configurations overlap one another in a time domain, the PUCCH resources being configured to send the HARQ-ACKs;
determining a target HARQ-ACK for a PDSCH based on a selected SPS configuration in the multiple SPS configurations; and
sending the target HARQ-ACK on a target PUCCH resource corresponding to the target HARQ-ACK.

10. The method according to claim 9, wherein determining the target HARQ-ACK for the PDSCH based on the selected SPS configuration in the multiple SPS configurations comprises:
determining a SPS configuration with a highest priority as the selected SPS configuration according to the priorities of the multiple SPS configurations; and
determining the target HARQ-ACK for the PDSCH based on the selected SPS configuration.

11. The method according to claim 10, wherein before determining that the PUCCH resources of the HARQ-ACKs for different PDSCHs configured based on the multiple SPS configurations overlap one another in the time domain, the method further comprises:
receiving multiple pieces of activated downlink control information (DCIs); and
determining the priorities of the multiple SPS configurations according to the multiple activated DCIs, different activated DCIs being configured to indicate the priorities of PDSCHs corresponding to different SPS configurations.

12. The method according to claim 11, wherein determining the priorities of the multiple SPS configurations according to the multiple activated DCIs comprises:
determining the priorities of the multiple SPS configurations according to information in a preset information field of the multiple activated DCIs.

13. The method according to claim 11, wherein determining the priorities of the multiple SPS configurations according to the multiple activated DCIs comprises:
determining the priorities of the multiple SPS configurations according to the formats of the multiple activated DCIs, and/or a type of a control resource set and/or a type of a search space.

14. The method according to claim 10, wherein the method further comprises:
receiving a radio resource control (RRC) message; and
determining the priorities of the multiple SPS configurations according to the RRC message.

15. The method according to claim 9, wherein in response to there are multiple target HARQ-ACKs, sending the target HARQ-ACK on the target PUCCH resource corresponding to the target HARQ-ACK comprises:
determining a minimum unit time length in multiple SPS configurations on which different PDSCHs corresponding to the multiple target HARQ-ACKs are based, the terminal calculating a time interval between receiving time of a PDSCH corresponding to an HARQ-ACK to be sent and sending time of the HARQ-ACK to be sent according to a preset coefficient and the unit time length; and sending the HAQR-ACK to be sent on a PUCCH resource determined according to an SPS configuration corresponding to the minimum unit time length.

16. The method according to claim 15, wherein in response to there is a minimum unit time length in multiple SPS configurations on which different PDSCHs corresponding to multiple HARQ-ACKs are based, sending the target HARQ-ACK on the target PUCCH resource corresponding to the target HARQ-ACK further comprises:
    determining an SPS configuration corresponding to a minimum period in the multiple SPS configurations with the minimum unit time length; and
    sending the HAQR-ACK to be sent on a PUCCH resource determined according to the SPS configuration corresponding to the minimum period.

17. The method according to claim 16, wherein in response to multiple SPS configurations have a minimum period, sending the target HARQ-ACK on the target PUCCH resource corresponding to the target HARQ-ACK further comprises:
    determining an SPS configuration corresponding to a smallest index value in the multiple SPS configurations with the minimum period; and
    sending the HAQR-ACK to be sent on a PUCCH resource determined according to the SPS configuration corresponding to the smallest index value.

18. The method according to claim 15, wherein in response to there is a minimum unit time length in multiple SPS configurations on which different PDSCHs corresponding to multiple HARQ-ACKs are based, sending the target HARQ-ACK on the target PUCCH resource corresponding to the target HARQ-ACK further comprises:
    determining an SPS configuration with a latest starting time for sending an HARQ-ACK in the multiple SPS configurations with the minimum unit time length; and
    sending the HAQR-ACK to be sent on a PUCCH resource determined according to the SPS configuration with the latest starting time for sending the HARQ-ACK.

19. The method according to claim 15, wherein in response to there is a minimum unit time length of multiple SPS configurations on which different PDSCHs corresponding to multiple HARQ-ACKs are based, sending the target HARQ-ACK on the target PUCCH resource corresponding to the target HARQ-ACK further comprises:
    determining an SPS configuration with an earliest starting time for sending an HARQ-ACK in the multiple SPS configurations with the minimum unit time length; and
    sending the HAQR-ACK to be sent on a PUCCH resource determined according to the SPS configuration with the earliest starting time for sending the HARQ-ACK.

* * * * *